(12) United States Patent
Okimoto et al.

(10) Patent No.: US 6,310,694 B1
(45) Date of Patent: Oct. 30, 2001

(54) MAIL TRANSMISSION SYSTEM WITH CANCEL MAIL SENDING FUNCTION

(75) Inventors: Satoshi Okimoto, Komaki; Hiroyuki Funahashi, Nagoya, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/076,877

(22) Filed: May 13, 1998

(30) Foreign Application Priority Data

May 14, 1997 (JP) .................................................. 9-124457

(51) Int. Cl.[7] ........................................................ G06F 15/00
(52) U.S. Cl. ...................... 358/1.15; 358/1.13; 358/402; 358/434; 358/437; 709/206
(58) Field of Search ......................... 350/1.9, 1.14, 350/1.15, 1.16, 404, 434, 437, 438; 709/204, 206, 216

(56) References Cited

U.S. PATENT DOCUMENTS

| | | | |
|---|---|---|---|
| 4,727,589 | * | 2/1988 | Hirose et al. .................. 709/204 |
| 5,404,231 | * | 4/1995 | Bloomfield ..................... 358/400 |
| 5,870,548 | * | 2/1999 | Nielsen ......................... 709/206 |
| 5,873,659 | * | 2/1999 | Edwards et al. ................ 400/61 |
| 5,958,005 | * | 9/1999 | Thorne et al. ................. 709/202 |
| 5,995,722 | * | 11/1999 | Kishida ......................... 358/1.15 |
| 6,020,981 | * | 2/2000 | Ogiyama ........................ 358/434 |
| 6,160,631 | * | 12/2000 | Okimoto et al. ................ 358/1.15 |
| 6,181,440 | * | 1/2001 | Masuda ......................... 358/434 |

FOREIGN PATENT DOCUMENTS

| | | |
|---|---|---|
| 63-237640 | 10/1988 | (JP) . |
| 4-172043 | 6/1992 | (JP) . |
| 5-002541 | 1/1993 | (JP) . |
| 6-149505 | 5/1994 | (JP) . |
| 7-175603 | 7/1995 | (JP) . |
| 8-130554 | 5/1996 | (JP) . |

\* cited by examiner

Primary Examiner—Edward Coles
Assistant Examiner—Joseph R. Pokrzywa
(74) Attorney, Agent, or Firm—Oliff & Berrigde PLC

(57) ABSTRACT

A mail transmission/reception system, in which a user on the transmitting end, who wishes to revise or delete a print mail mistakenly sent to a remote user, can transmit a cancel mail to the destination address of the same remote user to have the specified print mail deleted on the remote user's computer system in S690, thereby preventing the print mail from being printed on the remote user's end. Also, the user on the transmitting end can know whether the printing has been prevented based on mail returned from the remote user in S660–S680 and can take appropriate measures when the mail cancellation has not been successful.

10 Claims, 20 Drawing Sheets

HARDWARE STRUCTURE OF MAIL SERVER

MAIL TRANSMISSION SYSTEM WITH CANCEL MAIL SENDING FUNCTION

BACKGROUND OF THE INVENTION

1. Field of the Invention

The present invention relates to a mail transmission/reception system provided to a computer system capable of transmitting mail to and receiving mail from another computer system via a communication line.

2. Description of the Related Art

Data in the form of electronic mail is transferred between personal computers via a communication network system such as the Internet.

When mail sent from one computer is received by another computer, the received data is temporarily stored as mail data in a storage device, such as a hard disk drive, provided to the receiving end computer. The user on the receiving end can extract the contents of the received mail. In some cases, the user starts an application program on the computer in order to read data attached to the received mail and then to print the contents of the received mail and the attached file using a printer connected to the computer.

SUMMARY OF THE INVENTION

A user located at one computer can therefore supply printed material to another user at a remote computer through transmitting electronic mail to the remote computer through the communication network and then let the user at the remote computer to control his/her own computer to print out the received mail data.

However, this method of supplying printed material to a remote user via the communication network system is time-consuming. At the receiving end, the user has to start an application program, such as a word processor program, on his/her own personal computer. The user controls the application program to first read data from the electronic mail message and then to print the data by a printer connected to the computer.

According to one conceivable solution, the computer at the transmitting end creates the electronic mail so that the electronic mail includes print data which is prepared by a printer driver or the like. The computer on the receiving end can directly extract the print data from the mail and then output that data directly to the printer. It is possible to eliminate any intermediate processes such as starting an application program or controlling the application program to read in data. By allowing the receiver to directly obtain printed material of the received mail data from the printer, the sender can more effectively provide printed material to the receiver.

It is conceivable to design a system on the receiving end so that the system can automatically recognize mail, containing print data, from among the plurality of sets of received mail. This system then automatically prints the print data. The system will attain advantages of being used as a facsimile machine.

With this system, when mail is transmitted to a system at a remote user, that system will automatically print the mail. It is impossible for the user at the transmitting end to prevent the system from printing that mail even when the user has mistakenly sent mail containing incorrect data.

In view of the foregoing, it is an object of the present invention to provide a mail transmission system and a mail reception system capable of preventing the system at the receiving end from printing mail even after the mail is transmitted to the receiving end.

In order to attain the above and other objects, the present invention provides a mail transmission device capable of transmitting mail to a destination mail reception device via a communication line, the mail transmission device comprising: mail transmitting means capable of transmitting mail to mail reception devices via a communication line; mail designating means for designating mail that has been already transmitted to a certain destination mail reception device and that a user of the mail transmitting device does not wish to be printed on the destination reception device; cancel mail creating means for creating cancel mail including an instruction to cancel printing by the destination mail reception device of mail designated by the mail designating means; and cancel mail transmitting means for transmitting, via the communication line, the cancel mail to the destination mail reception device, to which the designated mail has been transmitted.

According to another aspect, the present invention provides a mail transmission system, provided in a computer system capable of transmitting mail to destination computer systems via a communication line, the mail transmission system comprising: mail transmitting means capable of transmitting mail to destination computer systems via a communication line; mail designating means for designating mail that has already been transmitted to a certain destination computer system and that a user of the transmitting computer system does not wish to be printed on the destination computer system; cancel mail creating means for creating cancel mail including an instruction to cancel the printing on the destination computer system of mail designated by the mail designating means; and cancel mail transmitting means for transmitting the cancel mail to the destination computer system, to which the designated mail has been transmitted.

According to a further aspect, the present invention provides a mail reception device capable of receiving mail from a mail transmission device via a communication line, the mail reception device comprising: a printer capable of printing mail; mail receiving means capable of receiving mail via a communication line; cancel mail determining means for determining whether mail, received via the communication line, is cancel mail containing an instruction to cancel printing of at least one set of previously-received mail and information designating the at least one set of mail desired not to be printed; and mail printing preventing means for, when the cancel mail determining means determines that the received mail is cancel mail, preventing the printer from printing the at least one set of mail designated by the cancel mail.

According to still another aspect, the present invention provides a mail reception system, provided in a computer system capable of receiving mail from another computer system via a communication line, the mail reception system comprising: cancel mail determining means for determining whether mail, received via the communication line, is cancel mail containing an instruction to cancel printing of at least one set of previously-received mail and information designating the at least one set of mail desired not to be printed; and mail printing preventing means for, when the cancel mail determining means determines that the received mail is cancel mail, preventing a printer, connected to the computer system, from printing the at least one set of mail designated by the cancel mail.

According to another aspect, the present invention provides a program storage medium capable of being read by a computer system capable of transmitting mail to destination computer systems via a communication line, the program comprising: a program of transmitting mail to destination computer systems via a communication line; a program of designating mail that has already been transmitted to a certain destination computer system and that a user of the transmitting computer system does not wish to be printed on the destination computer system; a program of creating cancel mail including an instruction to cancel the printing on the destination computer system of mail designated by the mail designating means; and a program of transmitting the cancel mail to the destination computer system, to which the designated mail has been transmitted.

According to another aspect, the present invention provides a program storage medium capable of being read by a computer system capable of receiving mail from another computer system via a communication line, the program comprising: a program of determining whether mail, received via the communication line, is cancel mail containing an instruction to cancel printing of at least one set of previously-received mail and information designating the at least one set of mail desired not to be printed; and a program of, when the received mail is cancel mail, preventing a printer, connected to the computer system, from printing the at least one set of mail designated by the cancel mail.

DETAILED DESCRIPTION OF THE INVENTION

Figure 1:
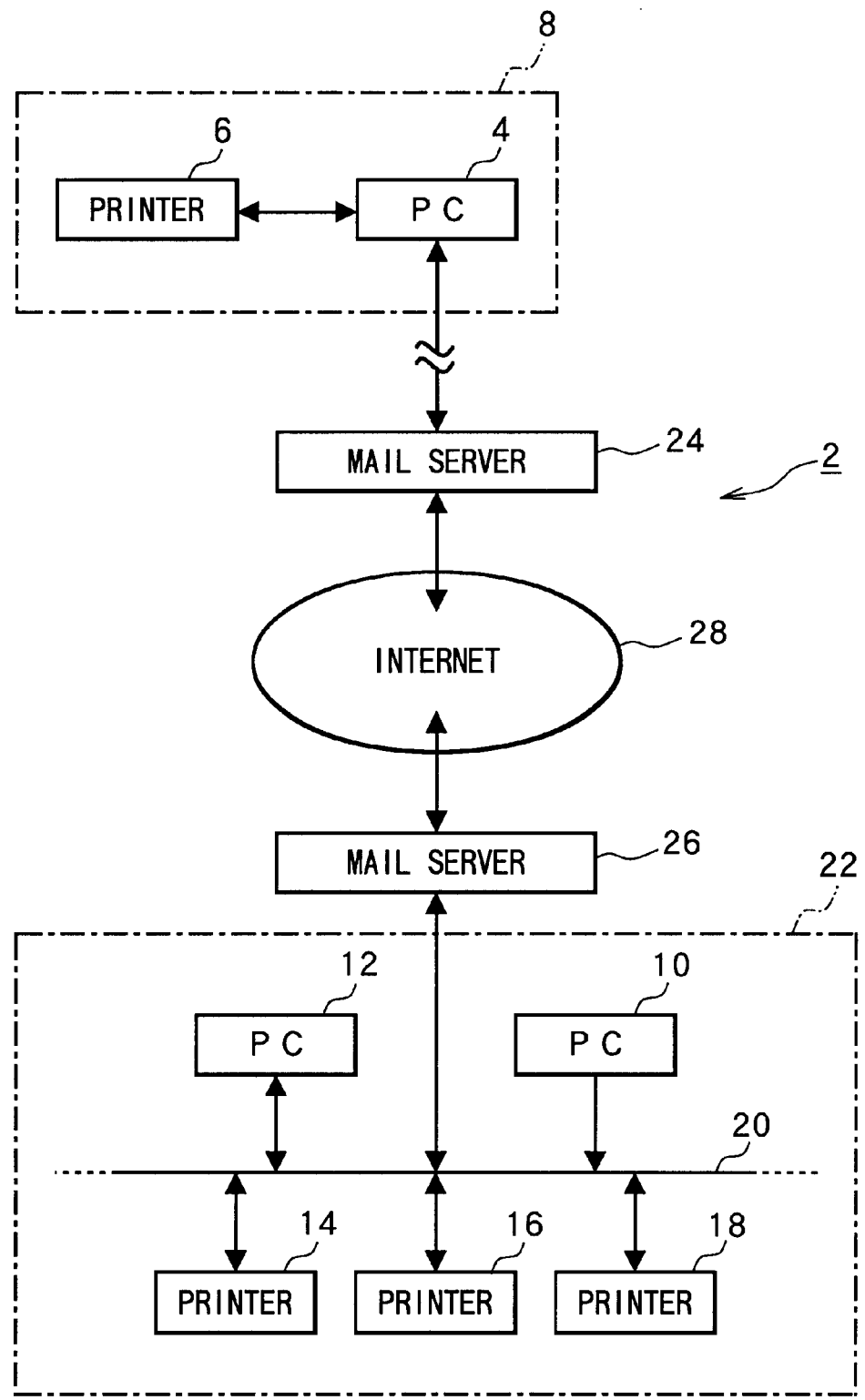
FIG. 1 is a block diagram showing the general configuration of a printing system according to an embodiment of the present invention.

The basic structure of the mail transmission/reception system according to the present invention will first be described below.

A mail transmission system of the present invention is provided in a computer system which is capable of transmitting mail to destination computer systems via a communication line. The mail transmission system can designate mail that has already been transmitted to a certain destination computer system and that a user of the transmitting computer system does not wish to be printed on the destination computer system. The mail transmission system creates cancel mail including an instruction to cancel the printing on the destination computer system of the designated mail. The mail transmission system transmits cancel mail to the destination computer system, to which the designated mail has been transmitted.

The computer system on the receiving end first receives mail to be printed, and then receives cancel mail to cancel printing of that mail. The computer system on the receiving end will determine, based on the contents of the cancel mail, the specific mail that the user on the transmitting end does not wish to be printed. The computer system then prevents that mail from being printed or stops printing that mail.

The mail transmission system may store a list of already-transmitted mail and the destinations of that mail. The mail transmission system may control a display device to display the list of all the sets of the already-transmitted mail and the destinations and to urge an operator to input, via an input device, designation of at least one set of mail desired not to be printed on the destination computer system in correspondence with the list displayed on the display device.

According to the present invention, mail reception system is also provided in a computer system capable of receiving mail from another computer system via a communication line. The mail reception system determines whether mail, received via the communication line, is cancel mail containing an instruction to cancel printing of at least one set of previously-received mail and information designating the at least one set of mail desired not to be printed. When the received mail is cancel mail, the mail reception system prevents a printer, connected to the computer system, from printing the at least one set of mail designated by the cancel mail.

For example, the mail reception system may select the designated mail from all the sets of mail, stored in the mail storing means, which have been received prior to the cancel mail and which have not yet been printed, and may delete the selected mail, thereby preventing the printer from printing the designated mail.

The mail reception system may transmit, to the source of the cancel mail, reply mail indicating that cancel has been attained successfully when the printer is prevented from printing the mail designated by the cancel mail before the printer starts printing the designated mail, that is, when no part of the designated mail is printed.

The mail reception system may transmit, to the source of the cancel mail, reply mail indicating that cancel has failed when the cancel mail is received after the printer has completed printing the designated mail or after the printer has started printing at least a part of the designated mail. That is, the reply mail indicating that cancel has failed is transmitted when the designated mail has already been completely printed or when printing of the designated mail is canceled in the middle of the printing of the mail. When the mail has already been completely printed, this reply mail may indicate that the designated mail has been printed. When printing of the designated mail is canceled in the middle of the printing of the mail, the reply mail may indicate that printing has been partially performed. In this case, the mail reception system may control the printer to print a symbol, indicating that the printing is stopped in the middle of the printing, after stopping printing of the mail.

A printing system according to a preferred embodiment, to which the mail transmission/reception system of the present invention is applied, will be described while referring to the accompanying drawings.

As shown in FIG. 1, the printing system 2 of the present embodiment includes a computer system 8, another computer system 22, and an Internet (communication network) 28. The computer system 8 and the computer system 22 are connected by the Internet 28 via two mail servers 24 and 26, respectively. The computer system 8 includes a personal computer 4 and a printer 6. The computer system 22 includes personal computers 10 and 12, and printers 14, 16, and 18, and a LAN (Local Area Network) 20 connected to the components 10 and 12 and the printers 14, 16, and 18.

The mail server 24 on one side of the Internet 28 is a service offered by an Internet provider, while the mail server 26 on the other side of the Internet 28 is a LAN specific mail server connected to the LAN 20 provided within a specific company.

In the printing system 2, several types of electronic mail can be transmitted between the computer systems 8 and 22. The several types of electronic mail include: ordinary mail; print mail according to the present invention; and cancel mail also according to the present invention. The ordinary mail is transmitted to a receiving end (transfer destination) for being freely processed by a receiver according to his/her desire. The print mail is transmitted to a receiving end (transfer destination) as specifically desired by a sender to be printed at the transfer destination. The cancel mail is transmitted to the receiving end (transfer destination) of the print mail as instructed by the sender to cancel printing of the print mail.

Figure 17:
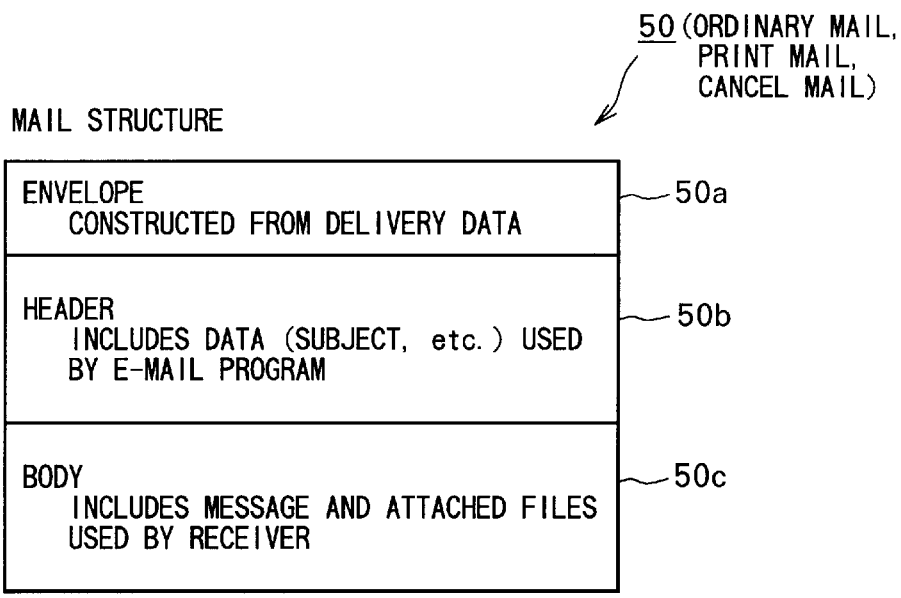
FIG. 17 is an explanatory diagram showing the structure of electronic mail.

Each mail (ordinary mail, print mail, and cancel mail) 50 has the mail structure shown in FIG. 17. That is, each mail data set 50 has: data of an envelope 50a constructed from delivery data; data of a header 50b including data to be used by an electronic mail program executed by the Internet 28, and data of a body section 50c including mail contents to be used by a receiver at the transfer destination.

The body 50c of the ordinary mail includes a sender's message. The body 50c is also attached with a data file if necessary. The header 50b of the ordinary mail includes: a message ID identifying that mail; an address of a mail server (24 or 28) connected to the sender; an address of the transfer destination; a subject of the mail; and the like.

The body 50c of the print mail does not include any messages. The body 50c is merely attached with a print data file including print data desired to be printed at the transfer destination. Similarly to the ordinary mail, the header 50b of the print mail includes: a message ID identifying that print mail; an address of a mail server (24 or 28) connected to the sender; an address of the transfer destination; a subject of the print mail; and the like. The header 50b of the print mail further includes print information (processing format data) indicative of how the print data included in the attached file is desired to be printed at the transfer destination. The print information includes: date and time when the print data in the attached file is desired to be printed; and file attributes such as a page description language (emulation), at which the print data is described, and the number of pages, onto which the print data has been prepared or edited.

The body 50c of the cancel mail is prepared blank. Similarly to the ordinary mail and the print mail, the header 50b of the cancel mail includes: a message ID identifying that cancel mail; an address of a mail server (24 or 28) connected to the sender; an address of the transfer destination; and the like. The header 50b of the cancel mail does not include data of any subject, but includes cancel message ID(s) designating message ID(s) of one or more sets of print mail data which the sender has already transmitted to the transfer destination and which the sender desires to prevent the transfer destination from printing. The header 50b further includes data of an instruction to cancel printing of the print data designated by the cancel message ID.

Figure 2:
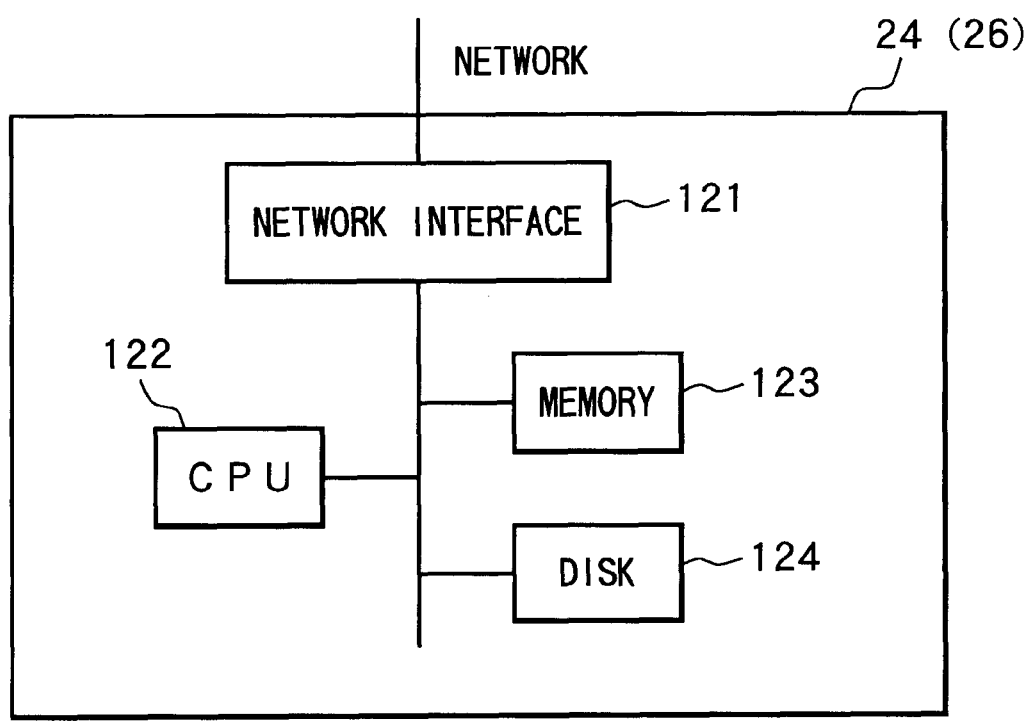
FIG. 2(a) is a block diagram showing a hardware structure of a mail server provided in the printing system.
FIG. 2(b) is a block diagram showing a hardware structure of a personal computer provided in the printing system.
Figure 2:
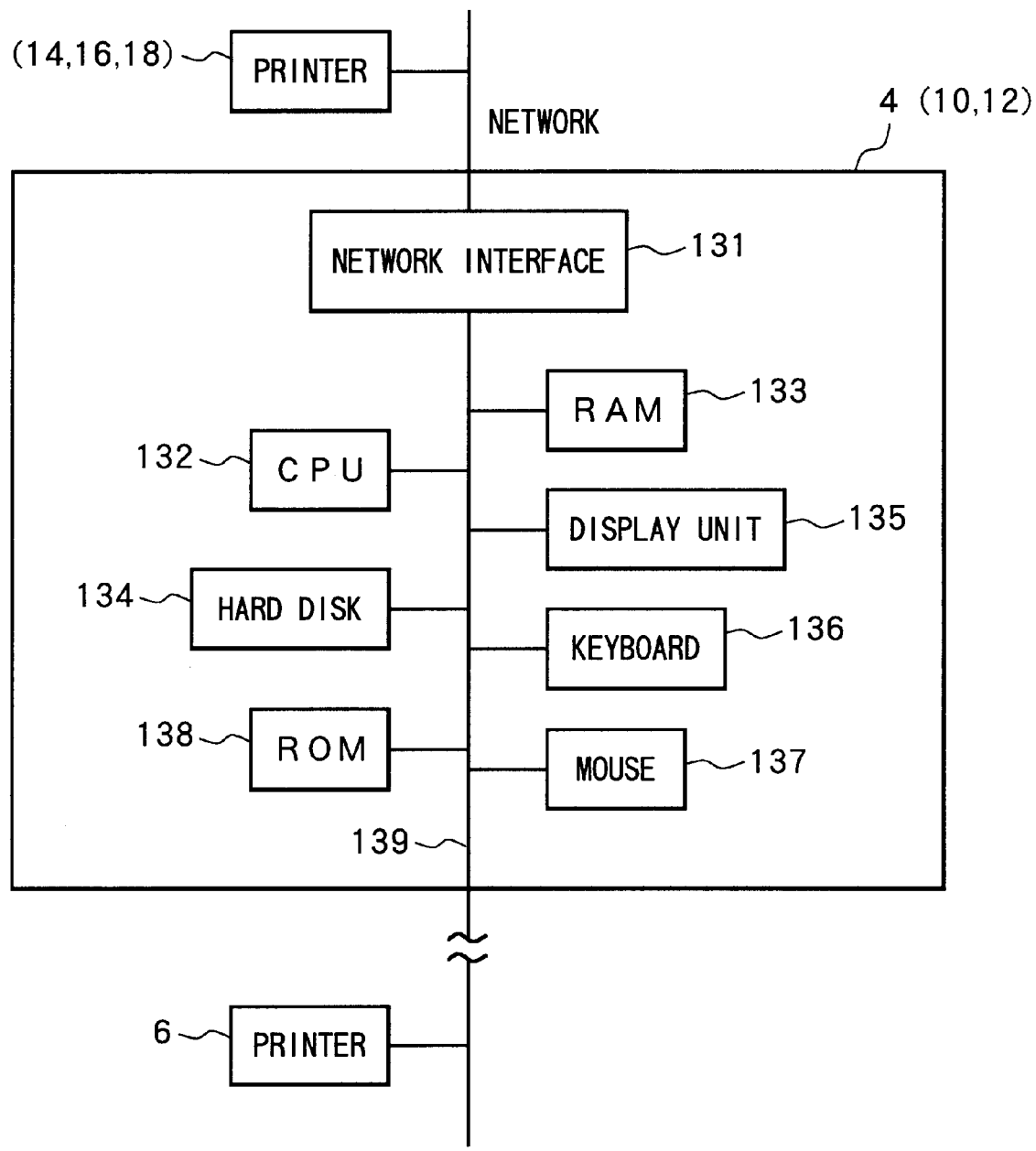

A hardware arrangement of each of the mail servers 24 and 26 will be described below with reference to FIG. 2(a). The mail server 24 (26) includes a network interface 121 serving to communicate with the corresponding personal computer system 8 (22) and the Internet 28, a central processing unit (CPU) 122, a memory 123 storing necessary data, and a disk 124 preparing a mail spool 34 for storing received mail. The mail server 24 (26) serves as a SMTP (Simple Mail Transfer Protocol) server 32 and a POP (Post Office Protocol) server 38 shown in FIG. 3.

A hardware arrangement of each of the personal computers 4, 10 and 12 will be described below with reference to FIG. 2(b). The personal computer 4 (10 or 12) includes a network interface 131 serving to communicate with the corresponding mail server 24 (26), a CPU 132 performing control operation, a RAM 133 for preparing a storage area for temporarily storing print data to be transmitted to a transfer destination, a mail log storage area, a cancel mail data storage area, and the like, a display unit 135, such as a CRT, serving to display various screen images such as those shown in FIGS. 6, 18, and 19, a keyboard 136 and a mouse-type input device 137 serving to input operator's instructions, a hard disk 134 for preparing therein a transmission log storage area and a mail box 40, and a ROM 138 storing a program of a printer driver 30 shown in FIGS. 4 and 5, a program of a print mail transmission utility 31a shown in FIG. 7, and a program of a print mail reception utility 31b shown in FIGS. 8–16. It is noted that all the elements in the personal computer 4 (10, 12) are connected via a bus 139.

It is noted that in the case of the computer system 8, the printer 6 is connected directly to the bus 139 of the computer 4. On the other hand, in the computer system 22, the personal computers 10 and 12 are connected to the printers 14, 16, and 18 via the network interface 131 and the LAN 20.

Figure 3:
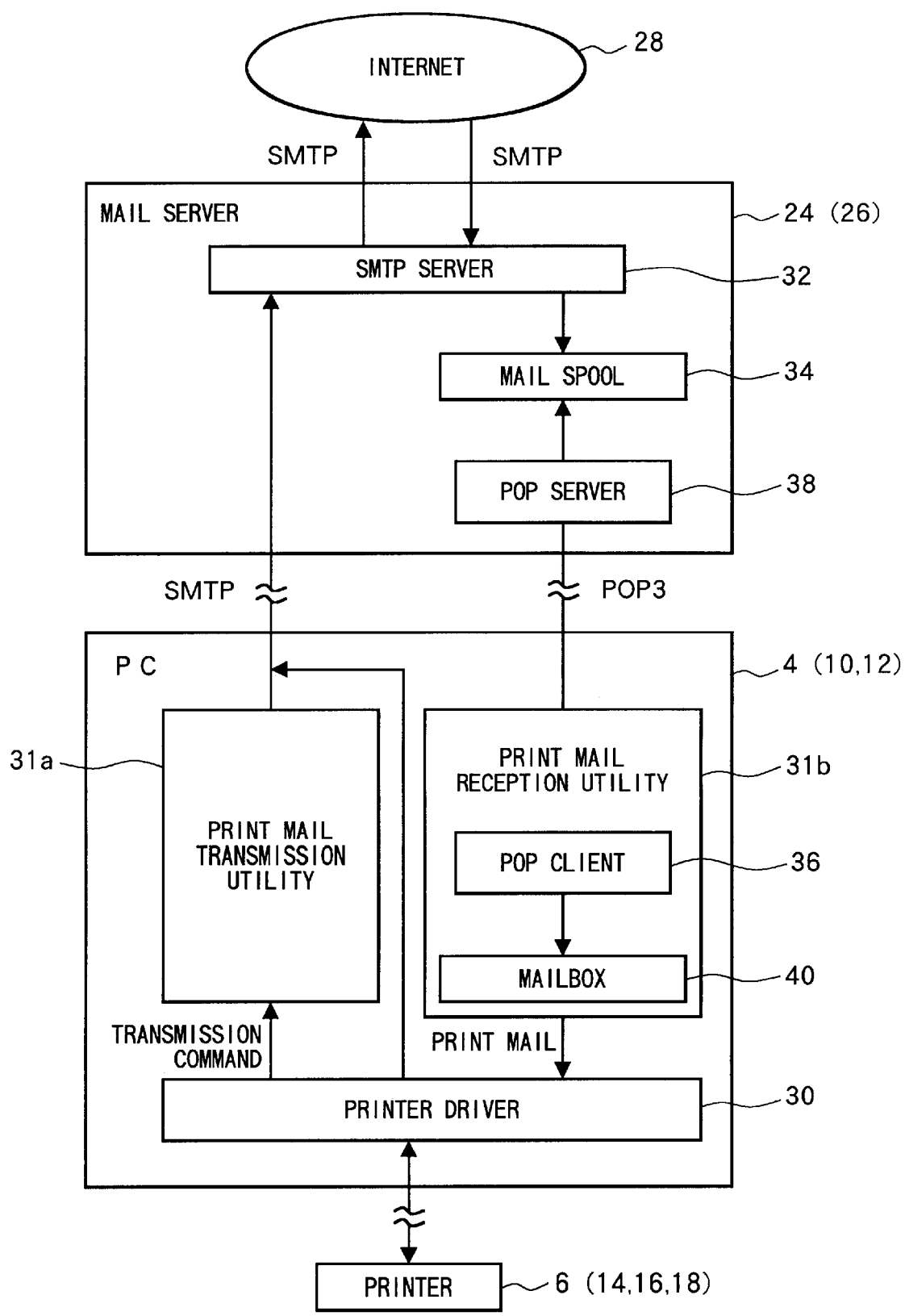
FIG. 3 is a block diagram showing a software structure of the mail server and the personal computer provided in the printing system.

FIG. 3 shows the software arrangement of the personal computer 4 and the mail server 24 connected to the personal computer 4. It is noted that the personal computers 10 and 12 have the same software arrangement with the personal computer 4. The mail server 26 has the same software arrangement with the mail server 24.

The personal computer 4 can execute the programs of the printer driver 30, the print mail transmission utility 31a, and the print mail reception utility 31b.

The printer driver 30 is capable of creating print data, outputting the print data to the printer 6 to print the print data, starting executing the print mail transmission utility 31a, and creating cancel mail and transmitting the cancel mail to the mail server 24. The printer driver 30 is executed by the CPU 132 when a print instruction is issued from some application programs (not shown) executing on the personal computer 4.

The print mail transmission utility 31a is for creating print mail based on the print data supplied from the printer driver 30 and for transmitting the print mail to the mail server 24. The print mail transmission utility 31a is executed by the CPU 132 when a print mail transmission instruction is issued from the printer driver 30.

The print mail reception utility 31b is for receiving electronic mail (print mail, cancel mail, and ordinary mail) addressed to the personal computer 4 and for executing processing operations in correspondence with the contents of the mail. The print mail reception utility 31b prints the print data included in the file attached to the print mail if needed. If necessary, the print mail reception utility 31b also prints the contents of the ordinary mail, that is, the message included in the ordinary mail and the file attached to the mail. The print mail reception utility 31b cancels printing of print mail designated by the cancel mail through deleting the print mail from the mail server 24. The print mail reception utility 31b may stop printing of the print mail in the middle of the printing. The print mail reception utility 31b is executed by the CPU 132 when the personal computer 4 is turned ON.

Although not shown in FIG. 3, the computer 4 can also execute: an ordinary mail transmission utility for creating and transmitting ordinary mail to the mail server 24; and an ordinary mail reception utility for receiving ordinary mail addressed to the computer 4 from the mail server 24.

The mail server 24 operates as the SMTP (Simple Mail Transfer Protocol) server 32 for receiving print mail from the print mail transmission utility 31a at the personal computer 4, for transmitting the print mail to the Internet 28, for receiving electronic mail (print mail, cancel mail, and ordinary mail) from the Internet 28 and for storing, in the mail spool 34, the mail addressed to the subject mail server 24. The mail server 24 also operates as the POP (Post Office Protocol) server 38 for transferring the mail stored in the mail spool 34 to the personal computer 4 when the personal computer 4 requests transmission of the mail.

The printer driver 30 will be described below in greater detail.

The printer driver 30 is for creating print data based on document data prepared and designated by some application programs executed on the computer 4. The printer driver 30 can supply the print data to the printer 6 thereby allowing the printer 6 to print the print data. The printer driver 30 is also for issuing a print mail transmission command to the print mail transmission utility 31a.

The print mail transmission utility 31a will be described below in greater detail.

The print mail transmission utility 31a is executed upon receipt of the print mail transmission command from the print driver 30. The print mail transmission utility 31a is for creating a print mail based on the print data created by the printer driver 30. The print mail is desired to be transmitted to a target computer 10 or 12 so that the print data included in the print mail will be printed thereat. In order to send the print mail to the target computer 10 or 12, the print mail transmission utility 31a transmits the print mail to the SMTP server 32 by Simple Mail Transfer Protocol (SMTP).

It is noted that the printer driver 30 is also for creating cancel mail for instructing the target computer not to print the print mail that has been supplied to the target computer prior to the cancel mail. In order to transmit the cancel mail to the transfer destination where the print mail, desired to be canceled, has been transmitted, the printer driver 30 transmits the cancel mail to the SMTP server 32 also by Simple Mail Transfer Protocol (SMTP).

It is also noted that the ordinary mail transmission utility (not shown in FIG. 3) can create ordinary mail and transmit the ordinary mail to the SMTP server 32 by Simple Mail Transfer Protocol (SMTP).

The SMTP server 32 will be described below in greater detail.

The SMTP server 32 is for transferring, to the Internet 28, electronic mail (print mail, cancel mail, and ordinary mail) received by SMTP from the computer 4. The Internet 28 transmits the received mail so that the mail will finally reach the target computer. It is noted that the Internet 28 is capable of transmitting, by SMTP, all of the print mail, the cancel mail, and the ordinary mail.

The SMTP server 32 can also receive, by SMTP, all the print mail, the cancel mail, and the ordinary mail from the Internet 28. The SMTP server 32 is for storing, on the mail spool 34, mail (print mail, cancel mail, and print mail) addressed to the subject mail server 24. The SMTP server 32 transfers all other mail again to the Internet 28.

The print mail reception utility 31b will be described below in greater detail.

The print mail reception utility 31b starts executing when the personal computer 4 is turned ON. The print mail reception utility 31b serves as a Post Office Protocol (POP) client 36. The print mail reception utility 31b prepares a mailbox 40 at a specific directory in an external memory, such as the hard disk drive 134, provided to the personal computer 4. The mail box 40 may be prepared in the RAM 133 provided in the personal computer 4. When the print mail reception utility 31b starts executing, the print mail reception utility 31b starts repeatedly requesting, at predetermined time intervals, the POP server 38 to transfer mail (print mail, cancel mail, and ordinary mail) addressed to the POP client 36 from the mail spool 34.

The POP server 38 is for transferring, from the mail spool 34, all the sets of mail data (print mail, cancel mail, and ordinary mail), addressed to the POP client 36, to the corresponding mailbox 40 with using the Post Office Protocol Version 3 (POP3). As described later, according to a certain condition, the print mail reception utility 31b will output the contents of the print mail and the ordinary mail to the corresponding printer 6 for printing. When receiving cancel mail, however, the print mail reception utility 31b will prevent the printer 6 from printing print mail designated by the cancel mail. The print mail reception utility 31b can control the printer 6 to stop printing the print mail during the middle of the printing.

The ordinary mail reception utility (not shown in FIG. 3) serves as a POP client, the same as or different from the POP client 36, to request the POP server 38 to transfer, by Post Office Protocol Version 3 (POP3), ordinary mail addressed to the POP client and stored in the mail spool 34.

With the above-described structure, the printing system 2 operates as described below.

It is now assumed that an operator at the personal computer 4 completes preparing document data through some application program, and desires to obtain printed matter of the prepared document or desires to supply printed matter of the document to the computer 10 in the remote computer system 22. In this case, the operator inputs his/her instruction to print the document. As a result, the application program issues a print command, whereupon the printer driver 30 is executed. The printer driver 30 creates print data based on the document data designated by the application program. When the user desires to obtain the printed matter at his/her end, the printer driver 30 supplies the print data to the printer 6, which in turn prints the print data on sheets of paper. When the user desires to supply the printed matter to either the computer 10 or 12, the printer driver 30 issues a mail transmission command to start the print mail transmission utility 31a. The print mail transmission utility 31a creates a print mail, including the print data desired to be printed at the destination computer, and transmits the print mail to the SMTP server 32 by Simple Mail Transfer Protocol (SMTP). The SMTP server 32 then transfers the received print mail using SMTP to the Internet 28 with the corresponding transfer destination.

When the operator at the computer 4 desires to stop printing of the print mail that has been transmitted already to the destination end, the operator controls the printer driver 30 to create cancel mail. The cancel mail designates the print mail that is desired to be canceled. The printer driver 30 transmits the cancel mail to the SMTP server 32 by Simple Mail Transfer Protocol (SMTP). The SMTP server 32 then transfers the received cancel mail using SMTP to the Internet 28 with the corresponding transfer destination.

Mail transferred in the Internet 28 by SMTP, whether ordinary mail, print mail, or cancel mail, is received by the SMTP server 32 at the mail server 26. Of this received mail, mail addressed to the mail server 26 is stored on the mail spool 34. All other mail is again transferred to the Internet 28.

When the personal computer 10 is turned ON, the print mail reception utility 31b starts being executed, and requests the POP server 38 to send the mail addressed to the POP client 36. In response to this request, the POP server 38 uses Post Office Protocol Version 3 (POP3) to transfer mail from the mail spool 34 to the mailbox 40 prepared for the print mail reception utility 31b. According to the setting by the user of the computer 10, the print mail reception utility 31b outputs the contents (print data) of the print mail and the contents (message and attached files) of the ordinary mail to an appropriate printer 14, 16, or 18 for printing. When receiving cancel mail, on the other hand, the print mail reception utility 31b requests the POP server 38 to delete from the mail spool 34 the print mail designated by the cancel mail. The print mail reception utility 31b can stop printing of the print mail when printing of the print mail has already been started.

Next, the process of the printer driver 30, the print mail transmission utility 31a, and the print mail reception utility 31b will be described below in greater detail.

The process of the printer driver 30 will be first described with reference to FIG. 4.

In the example described below, the printer driver 30 will be described as a program executing on the computer 4. However, the processes of the printer drivers 30 operating on the computers 10 and 12 are exactly the same.

The process of the printer driver 30 is started when an application program, executing on the personal computer 4, such as a word processor program, a spreadsheet program, a database program, or the like issues a print command. It is noted that the application program issues the print command when the operator of the computer system 8 designates document data, desired to be printed, and then inputs, via the mouse-type input device 137 or the key board 136, his/her instruction to print the document data. The application program issues the commend to start the printer driver 30 also when the operator inputs his/her instruction to create cancel mail.

At the beginning of the process, a print process setting screen is displayed in S102 on the display 135 provided to the computer 4. Although not shown in the drawings, the print process setting screen shows a "print execution" button and a "cancel mail" button. The operator clicks the mouse-type input device 137 while specifying with a mouse cursor the "print execution" button or the "cancel mail" button. When the operator desires to obtain printed matter of the document data at the computer system 8 or 22, the operator selects the "print execution" button. It is noted that the operator can also set, on the print process setting screen, the number of copies desired to be obtained on the document data. When the operator desires to create cancel mail, on the other hand, the operator selects the "cancel mail" button. Then, the setting operation is completed on the print process setting screen. The program determines in S104 whether or not the "cancel mail" button has been clicked.

When the operator selects the "print execution" button ("No" in S104), the process in S120 is immediately executed to convert the document data, designated by the application program for printing, into print data of a predetermined format. In this example, the document data is converted into print data which is described by a predetermined page description language (emulation) capable of being interpreted by the printer 6. Representative examples of the page description language include PCL, PostScript, GDI, and the like.

At this time, the print process setting screen displays two selection items "print" and "mail" in an item of "output". When desiring to print the print data at the printer 6 in this computer system 8, the user selects the item "print". When desiring to transmit the print data as print mail to be printed in the remote computer system 22, on the other hand, the user selects the item "mail".

In S130, the printer driver program determines whether "print" or "mail" has been checked in the "output" item of the print process setting screen. When "print" is selected in the "output" item in S130, then the print data is outputted in S140 to the printer 6 in this computer system 8, producing printed matter from the printer 6. It is noted that a default setting of the "output" item is set to "print". Accordingly, the process of S140 is executed even when the "output" item is not set in S130. After the printing process of S140 is executed, the process of the printer driver 30 ends.

On the other hand, when "mail" is selected for the "output" selection in the print process setting screen in S130, the print data is transferred as a set of file data in S150 to a predetermined storage area in the RAM 133 of the personal computer 4 so that the print data will be transferred to the print mail transmission utility 31a.

Figure 7:
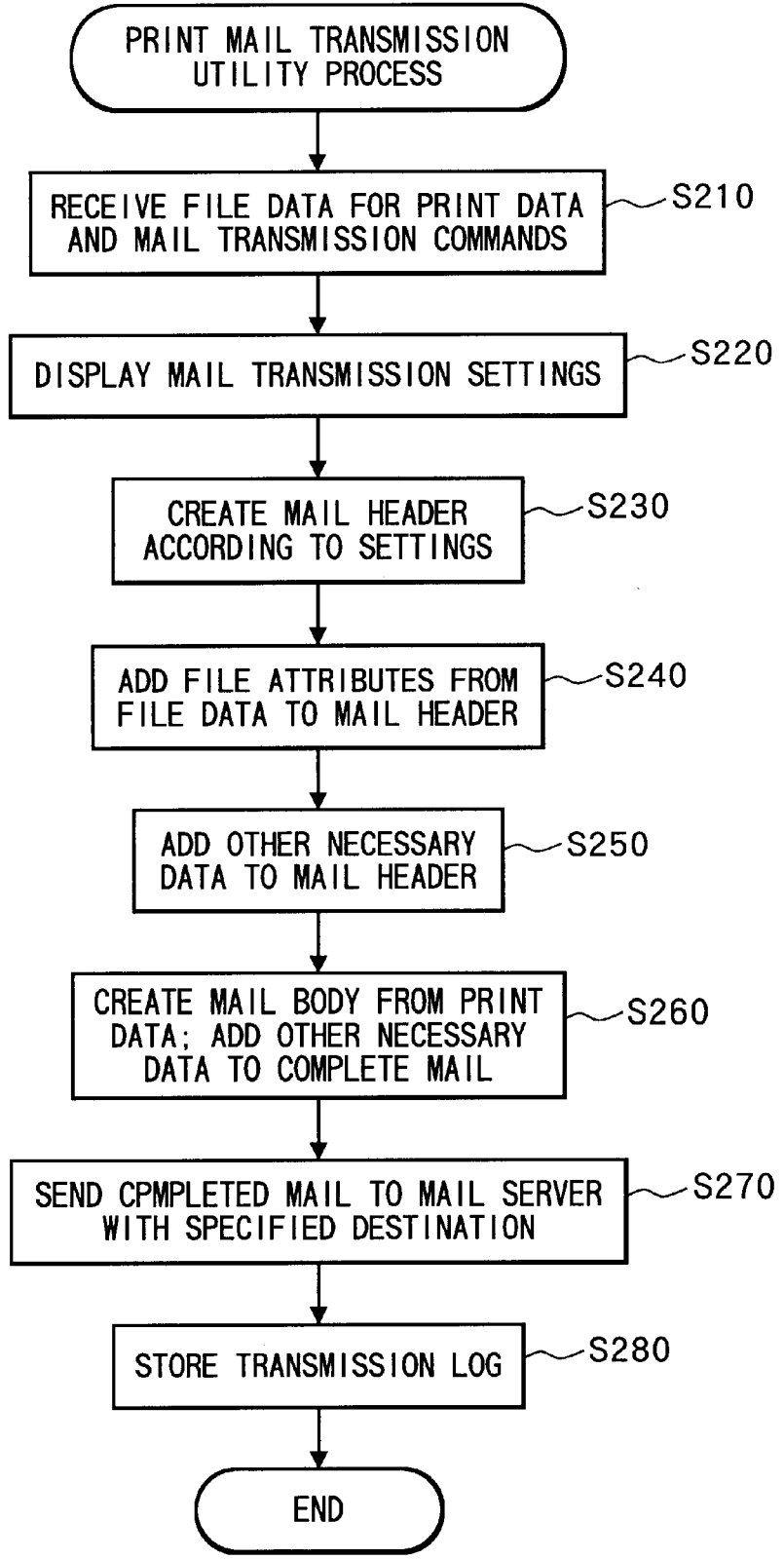
FIG. 7 is a flowchart showing a print mail transmission utility process executed by the printing system.

Next, in S160, the printer driver program starts executing the print mail transmission utility 31a of FIG. 7. Then, in S170, the printer driver program transmits, to the print mail transmission utility 31a, a mail transmission command and file data (file information) of the print data presently being stored in the RAM 133. The file data includes: data of file attributes of the subject print data; and data of the storage area in the RAM 133 where the subject print data is stored. The file attributes include: data of a file type of the print data; data of the number of pages into which the print data has been edited or prepared; and data of the number of copies into which the print data is desired to be copied. The file type data includes a code indicative of the page description language (emulation) at which the print data has been prepared in S120. After sending the file data and the mail transmission command to the mail transmission utility 31a, the printer driver process ends.

On the other hand, if the program determines that the "cancel mail" button has been clicked ("yes" in S104), then a cancel mail issuing process of S110 is executed.

Figure 5:
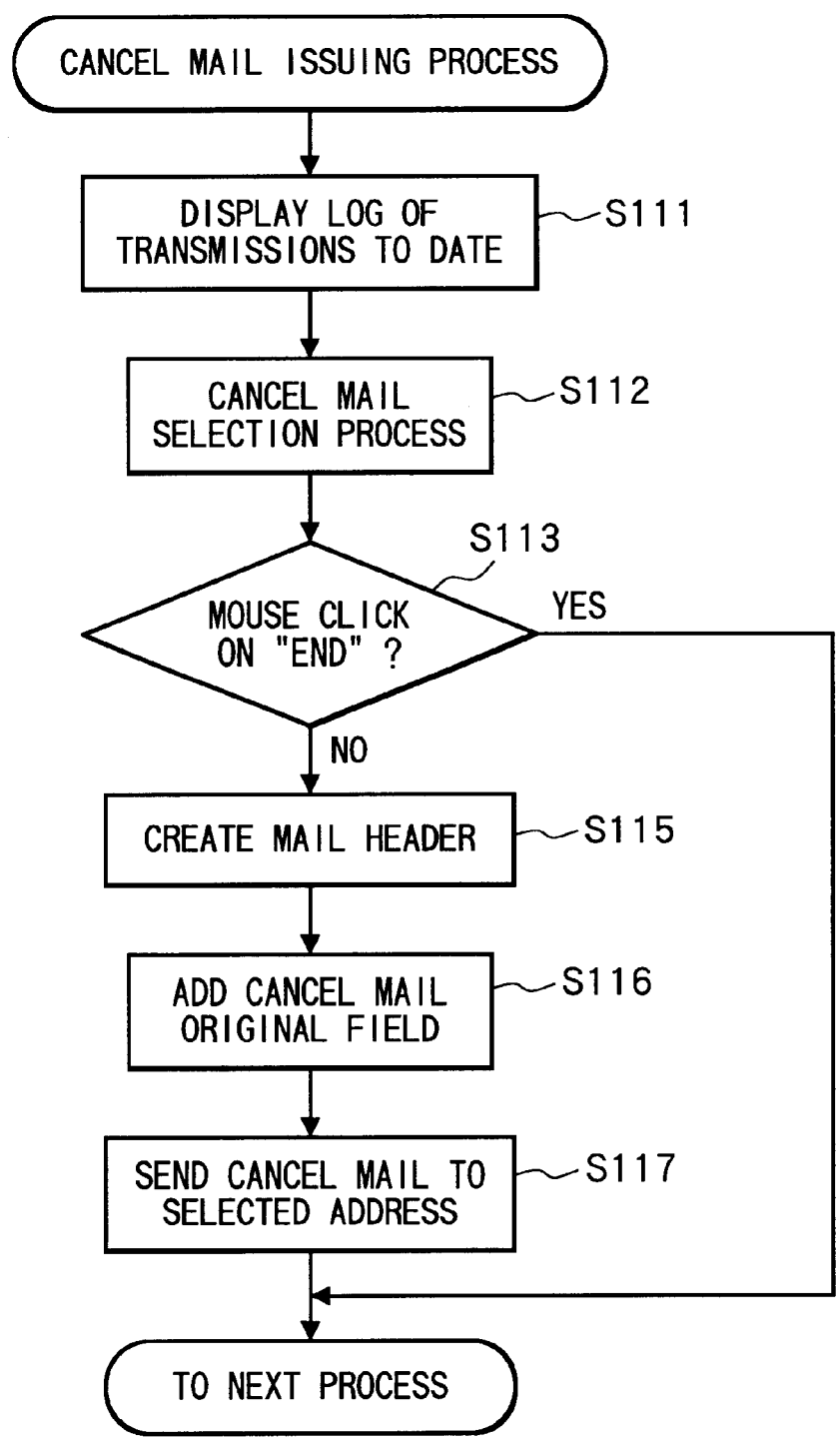
FIG. 5 is a flowchart showing a cancel mail issuing process, a part of the printer driver process.

The cancel mail issuing process of S110 will be described below with reference to FIG. 5.

Figure 6:
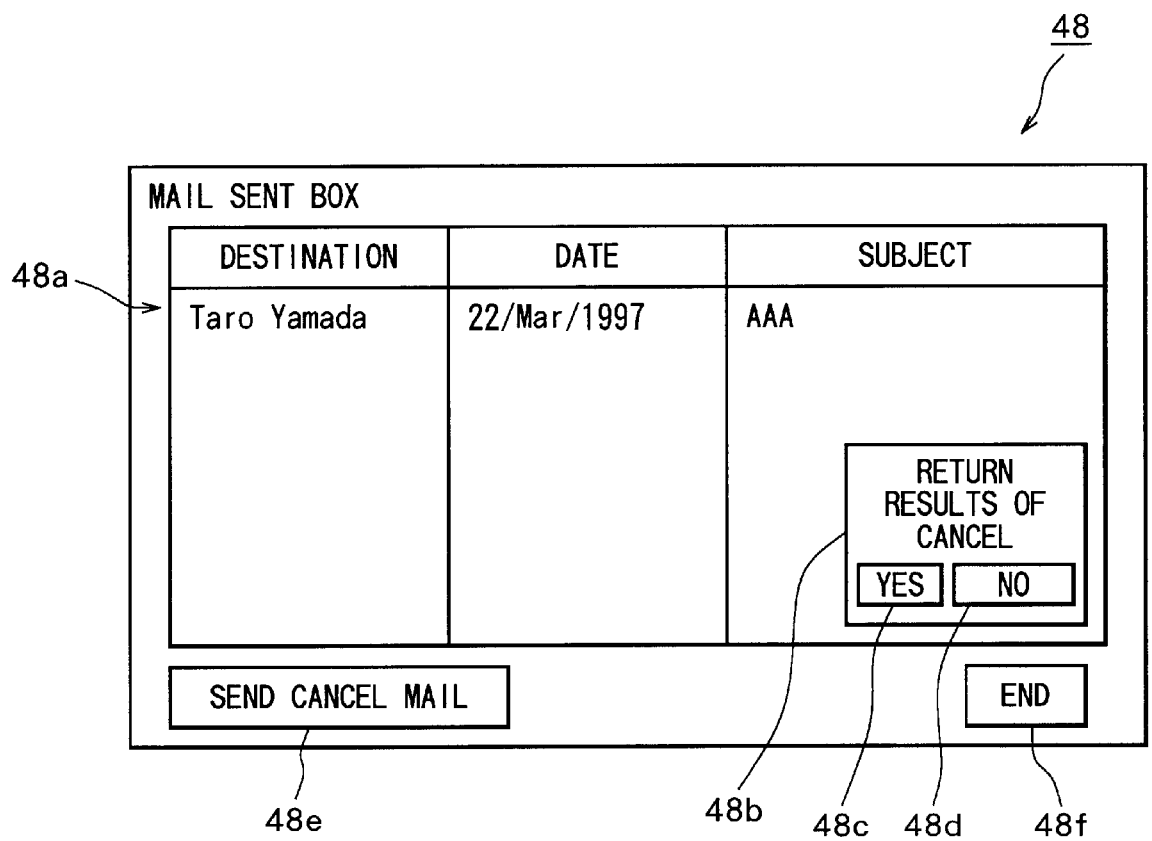
FIG. 6 illustrates a transmitted mail box displayed during the cancel mail setting operation.

At the beginning of the cancel mail issuing process, in S111, log data of all the sets of print mail, that have been transmitted from the present personal computer 4 to remote users before the click of the "cancel mail" button, is read from the transmission log storage area prepared in the hard disk 134. It is noted that as will be described later, the transmission log storage area stores a record of each print mail in S280 of the print mail transmission utility 31a after the print mail is transmitted to a corresponding remote user. Then, a mail sent box 48 is displayed on the display unit 135 as shown in FIG. 6 to show a print mail transmission list 48a listing logs of all the transmitted print mail.

Then, the operator performs a cancel mail selection process of S112 while viewing the mail sent box 48. In this process, the operator can select, among the plurality of sets of print mail displayed on the list 48a, one or more sets of print mail that the user wishes to cancel and therefore that the user wishes to remote-control the transfer destination not to print. The operator performs his/her mail selection operation by using the mouse-type input device 137 to click on the mail, desired to be canceled, on the print mail transmission list 48a. The printer driver 30 detects the mouse click operation by the operator over a certain set of print mail, and indicates that the print mail is targeted for cancellation by highlighting the same on the mail sent box 48. The printer driver 30 then displays a popup menu 48b on the mail sent box 48. The popup menu 48b is for urging the user to click on a "Yes" button 48c or a "No" button 48d to indicate whether or not the user wishes to receive, from the destination computer, return mail indicating the results of the cancel operation.

The cancel mail selection process of S112 ends when the user clicks on either a "send cancel mail" button 48e or an "end" button 48f displayed on the mail sent box 48. It is noted that clicking on the "send cancel mail" button 48e will have no effect if no mail has been selected from the transmission list 48a.

Next, the program determines in S113 whether or not the user has clicked on the "end" button 48f. When the user has clicked on the "end" button 48f ("yes" in S113), then the cancel mail issue process of S110 ends, and the printer driver process of FIG. 4 also ends.

When the user has not yet clicked on the "end" button 48f ("no" in S113), on the other hand, the program determines that the user has clicked on the "send cancel mail" button 48e. Then, the program creates a normal mail header 50b in S115. That is, the mail header 50b is created to indicate a message ID identifying the subject cancel mail; an address of the mail server 24 connected to the present computer 4; an address of the transfer destination, to which the print mail, selected by the user in S112 for cancellation, has been transmitted; and the like. It is noted that the address of the transfer destination of the selected print mail is determined based on the transmission log in the hard disk 134.

Next, in S116, the program adds a cancel mail original field to the mail header 50b. This cancel mail original field includes a message ID (cancel message ID) indicative of the print mail selected by the user in S112 for cancellation. Data of this cancel message ID is created based on the message ID of the selected print mail stored in the transmission log stored in the hard disk 134.

The cancel mail original field further includes data of an instruction to cancel printing of the print mail designated by the cancel message ID. The cancel mail original field also includes data of an instruction for whether or not the user (sender) wishes to receive return mail indicative of the results of the cancellation. This instruction is created based on the user's selection made in the popup menu 48b also during the process of S112. Data of the cancel mail original field will be used in the print mail reception utility 31b at the receiving end as will be described later. It is noted that the body 50c of the cancel mail is blank, and therefore creation of the cancel mail is completed once the mail header 50b is completed.

Thus, the body 50c of the cancel mail is prepared blank. The header 50b of the cancel mail is prepared to include: the message ID identifying the subject cancel mail; the address of the mail server 24 connected to the present computer 4; the cancel message ID indicative of the message ID of the print mail selected for cancellation; data of the instruction to cancel printing of the print data designated by the cancel message ID; indication about designation of return mail; and the address of the transfer destination, at which the selected print mail has been transmitted.

Next, the thus completed cancel mail is sent to the mail server 24 in S117, as addressed to the destination of the print mail selected to be canceled. Then, the cancel mail issuing process of S110 ends, and the printer driver process of FIG. 4 also ends.

The processes of S115–S117 are executed repeatedly for all the sets of print mail that the user has selected in S112 for cancellation from the print mail transmission list 48a. Accordingly, cancel mail is created for each of the selected print mail, and the cancel mail is transmitted to the mail server 24.

It is noted that if the destination address is the same for more than one set of the print mail selected in S112, only one cancel mail may be created for the more than one sets of print mail. The cancel mail is created to contain more than one cancel message IDs indicative of those more than one sets of print mail, and is transmitted to the corresponding single destination.

Subsequently, the cancel mail is transmitted by the mail server 24 to the Internet 28, along which the cancel mail is transferred until eventually arriving at the destination. As described later, the computer system at the destination address will attempt to prevent the printing of the print mail indicated by the one or more cancel message IDs included in the cancel mail. The computer system will delete data of the print mail.

Next, the process of the print mail transmission utility 31a will be described with reference to FIG. 7. The process of the print mail transmission utility 31a is executed when the operator wishes to supply printed matter of the print data to a remote user.

In the example described below, the print mail transmission utility 31a will be described as a program executing on the computer 4. However, the processes of the print mail transmission utilities 31a operating on the computers 10 and 12 are exactly the same.

Figure 4:
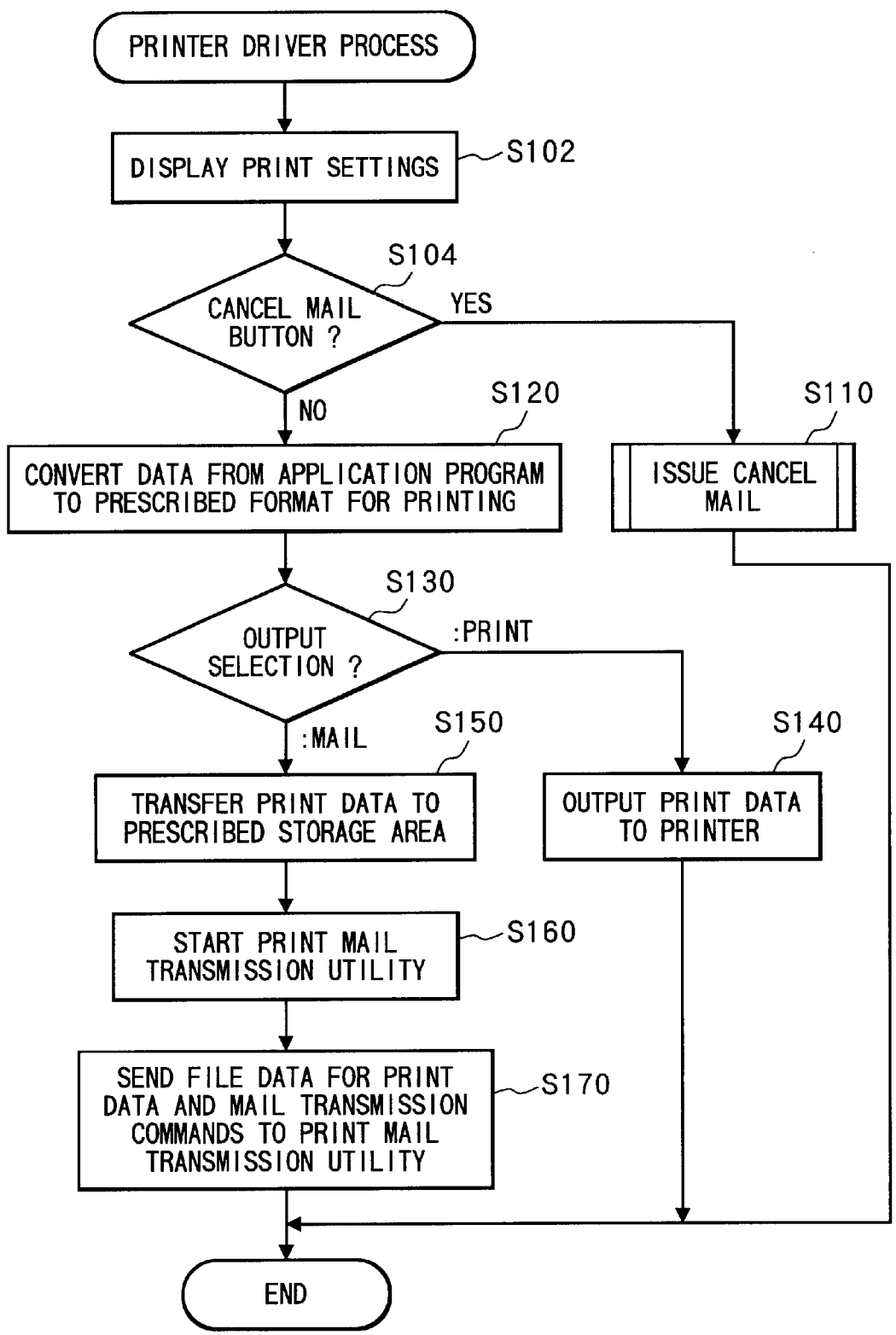
FIG. 4 is a flowchart showing a printer driver process executed by the printing system.

The process of the print mail transmission utility 31a is started in S160 of the print driver process of FIG. 4. At the beginning of this process, in S210, the program receives the mail transmission command and the file data of the print data to be transmitted, which is sent from the printer driver process in S170.

Next, in S220, a print mail transmission settings screen is displayed on the display 135 provided in the computer system 8. Although not shown in the drawings, the print mail transmission settings screen requests the user of the computer system 8 to set information necessary for transmitting mail. The data necessary for the mail transmission includes the SMTP type employed for this transmission, address of the mail server 24, destination to which the print data is desired to be transmitted, a subject of the mail, and indication whether or not the user wishes to receive a return mail from a destination computer. In this example, it is assumed that the print data is desired to be transmitted to the personal computer 10 in the computer system 22. The print mail transmission settings screen further requests the user to input settings for date and time when the print data is desired to be printed at the destination. The print mail transmission settings screen can allow the user to input the number of copies desired to be outputted at the transfer destination.

In S230, a mail header 50b is created according to the information set by the user in S220. A message ID identifying the subject mail is also created and included in the mail header 50b. Then, in S240, the file attributes included in the file data, which is received in S210 from the printer driver 30, are added to the mail header 50b. In S250, all other necessary data, which is set in S220 as needed, is added to the mail header 50b.

Then, in S260, print data is read from the RAM 133 at the storage area indicated by the file data received from the printer driver 30 in S210. The print data is included in the mail body 50c as an attached file. Finally, all other necessary data, such as the envelope data 50a, is added to complete a set of print mail data. As a result, the set of print mail data 50 is created as shown in FIG. 17.

Accordingly, the body 50c of the print mail is constructed from the attached file including print data desired to be printed at the transfer destination. The header 50b of the print mail includes: the message ID identifying the subject print mail; an address of the mail server 24 connected to the computer 4; an address of the transfer destination; the subject of the print mail; and the like. The header 50b further includes indication whether or not the sender wishes to receive a return mail from a destination computer. The header 50b of the print mail further includes print information (processing format data) indicative of how the print data included in the attached file is desired to be printed at the transfer destination. The print information includes the file attributes such as: a code indicative of the page description language, at which the print data has been prepared; the number of pages, onto which the print data has been edited; and the number of copies of the print data desired to be outputted at the transfer destination. The print information also includes data of "date and time" when the print mail is desired to be printed if this "date and time" data is set by the sender in S220.

In S270, the thus completed set of print mail data 50 is transmitted to the mail server 24 with the destination set in S220. A log of this transmission is stored in S280 in the transmission log storage area prepared in the hard disk drive 134 or the like. Then, the mail transmission utility process ends.

The print mail is then transmitted via the mail server 24 to the Internet 28 side, where the print mail 50 is transferred until arriving at its final destination, the computer 10 in this example.

The process of the print mail reception utility 31b will be described below with reference to the flowcharts in FIGS. 8–16. In the example described below, the print mail reception utility 31b is executed on the personal computer 10. It is noted that the print mail reception utility 31b executed on other personal computers 4 and 12 execute the same processes as those of FIGS. 8–16.

The print mail reception utility 31b can print not only print mail, which has been created by the print mail transmission utilities 31a provided on remote computers, but also ordinary mail which has been created by ordinary mail transmission utilities provided also on the remote computers.

The process of the print mail reception utility 31b is started when the personal computer 10 is turned ON. At the initial start up timing of this process, an interrupt timer is set. Then, the process of the print mail reception utility 31b will be repeatedly executed from S310 at a prescribed interval, for example, every 10 seconds.

At the beginning of the process, the program accesses, in S310, the POP server 38 in the mail server 26 via the LAN 20 to check for mail newly arrived at that mail spool 34. If one or more newly-arrived sets of mail data 50 (print mail, ordinary mail, and cancel mail) is stored in the mail spool 34 as destined for the personal computer 10, then the POP server 38 responds to the personal computer 10 while sending information of the new mail to the print mail reception utility 31b.

In S320, the program checks the response from the POP server 38 to determine whether one or more sets of newly-arrived mail data (print mail, ordinary mail, or cancel mail) exists in the mail spool 34. When it is determined that there is no new mail ("no" in S320), then a timer counter value for the next timer interrupt is initialized in S330. In S340, the timer is started. Accordingly, as long as the timer is not stopped, the print mail reception utility process will be repeatedly executed from S310 at the predetermined interval.

Then, in S350, an initialization screen is displayed on a display 135 for allowing a user of the computer 10 to set his/her desire to modify a setting of the print mail reception utility process. In S360, the program determines whether the user has indicated his/her desire to modify the setting. If the user wishes to modify the setting ("yes" in S360), then the timer for the timer interrupt is stopped in S370. Next, in S380, a setting screen is displayed on the display 135 for allowing the user to set his/her desired setting conditions to be used during the print mail reception utility process. In S380, the program receives input from the user for modifying the setting conditions.

These setting conditions include: a condition to be utilized in S840 (FIG. 12) for judging whether received mail should be printed; a condition to be utilized in S999 (FIG. 13) for judging whether the received mail should be printed with a cover page; a condition to be utilized in S1070 (FIG. 15) for judging whether the received mail should be deleted from the mail box 40 after the mail is printed; a condition to be utilized in S1110 (FIG. 16) for judging whether the received mail should be deleted from the mail spool 34 after the mail is printed, or the like. For example, the condition, to be utilized in S840, may be set so that each set of received mail should be printed when at least one of first through third judgments (1)–(3) described below is made affirmative. The first judgment (1) is for judging whether or not the received mail is print mail created by and sent from the print mail transmission utility 31*a*. The second judgment (2) is for judging whether or not the received mail has been sent from a transmitter specified by the user during the setting process of S380. The third judgment (3) is for judging whether or not the received mail is of a certain subject also set by the user during this setting process of S380.

After the settings in S380 are completed, the process returns to S330, in which the timer counter value is again initialized. The timer is again started in S340.

If no instruction to modify the setting conditions is inputted ("no" in S360), on the other hand, a mail print selection process of S400 is executed.

Figure 18:
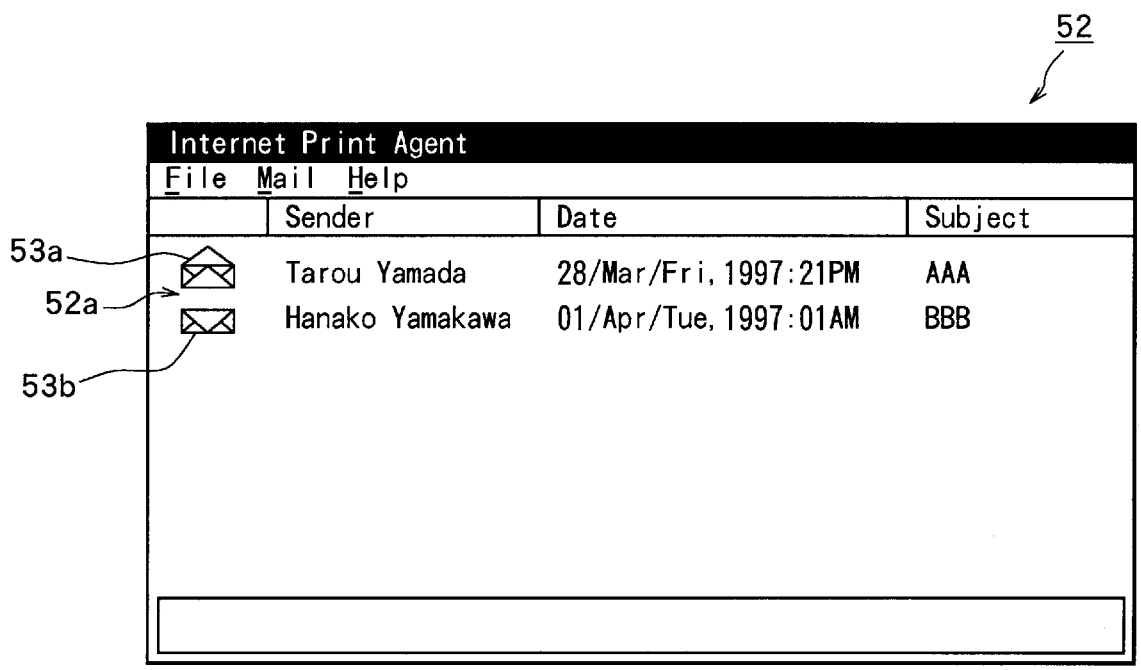
FIG. 18 is an explanatory diagram showing the configuration of a mail log window.

It is noted that although not shown in the drawings, the initialization screen displayed in S350 shows an item "display mail log window" on its menu screen portion. When the user selects the item "display mail log window" with using the mouse-type input device 137, provided to the computer 10, a mail log window 52 shown in FIG. 18 is displayed on the top of the initialization screen. The mail log window 52 is created based on mail log data stored in a mail log data storage area in the RAM 133 of the personal computer 10.

As shown in FIG. 18, the mail log window 52 shows, in a list, one or more sets of mail log data 52*a* indicative of one or more sets of mail data (print mail and ordinary mail) already received from the mail spool 34. An opened mark 53*a* is appended to each set of mail log data 52*a*, whose corresponding mail (print mail and ordinary mail) has already been printed. An unopened mark 53*b* is appended to each set of mail log data 52*a* whose corresponding mail (print mail and ordinary mail) has not yet been printed.

The mail print selection process of S400 will be described below with reference to FIG. 9.

At the beginning of the process, the mail log window 52 is displayed on the display 135 of the personal computer 10 if the user has selected the item "display mail log window" on the initialization screen. The mail print selection process therefore first determines in S410 whether the left button of the mouse-type input device 137 has been clicked when a mouse cursor is being positioned over one set of mail log data 52*a*.

It is noted that if the user has not accessed the initialization screen to display the mail log window 52, on the other hand, the mail log window 52 is not displayed. Accordingly, determinations in the judging process of S410 becomes "No". Because determinations in the following judging processes of S430, S460, and S490 become all "no, " and accordingly the process returns to S360. Thus, when the user has not accessed the initialization screen to display the mail log window 52, the mail print selection process of S400 is essentially not executed.

If the left button has been clicked over one set of mail log data 52*a* on the mail log screen 52 ("yes" in S410), then a line, on which the set of mail log data 52*a* indicated by the mouse cursor is located at the time of the click, is highlighted in S420 to indicate the selection performed by the user. If the left button has not been clicked over any mail log data 52*a* ("no" in S410), then the program determines in S430 whether the right button of the mouse-type input device 137 has been clicked over the mail log window 52. If the right button has been clicked ("yes" in S430), then the program determines in S440 whether there exists a highlighted set of mail log data 52*a*. In other words, the program determines whether one line in the mail log window 52 has been already selected through the user's manipulation of the left button.

Figure 19:
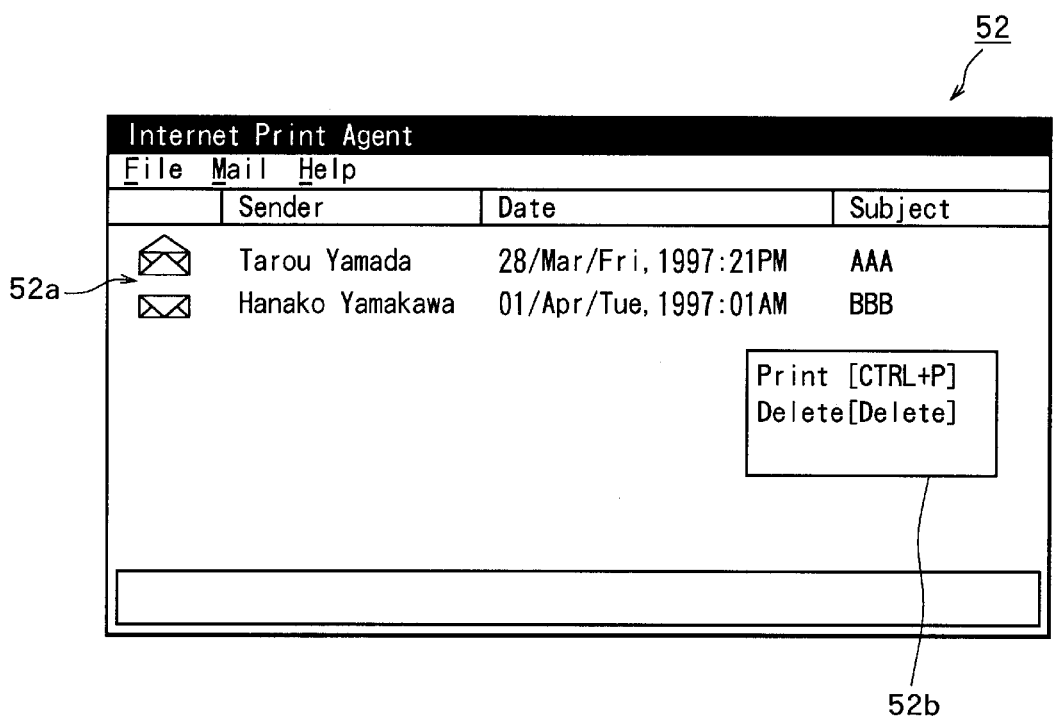
FIG. 19 is an explanatory diagram showing the configuration of the mail log window displaying a popup menu.

If no highlighted mail log data 52*a* exists ("no" in S440), the process returns to S360. On the other hand, if highlighted mail log data 52*a* does exist in the mail log window 52 ("eyes" in S440), then a popup menu 52*b* is displayed in S450 on the top of the mail log window 52 as shown in FIG. 19.

The determination processes of S460 and S490 relate to the selection made by the user on the popup menu screen 52*b*. That is, if "delete" (delete mail) displayed on the popup menu 52*b* is selected by the user ("yes" in S460), then in S470 the highlighted mail (print mail or ordinary mail) is deleted from the mailbox 40, and corresponding mail log data is deleted from the mail log data storage area in the RAM 133 of the personal computer 10. After the mail log data is thus deleted, the display of the mail log window 52 is updated in S480, reflecting that the mail has been deleted.

If "print" (print mail) has been selected ("yes" in S490) on the popup menu 52*b*, on the other hand, then the highlighted mail (print mail or ordinary mail) is printed according to the process beginning from S980 (FIG. 13) as will be described later.

Figure 10:
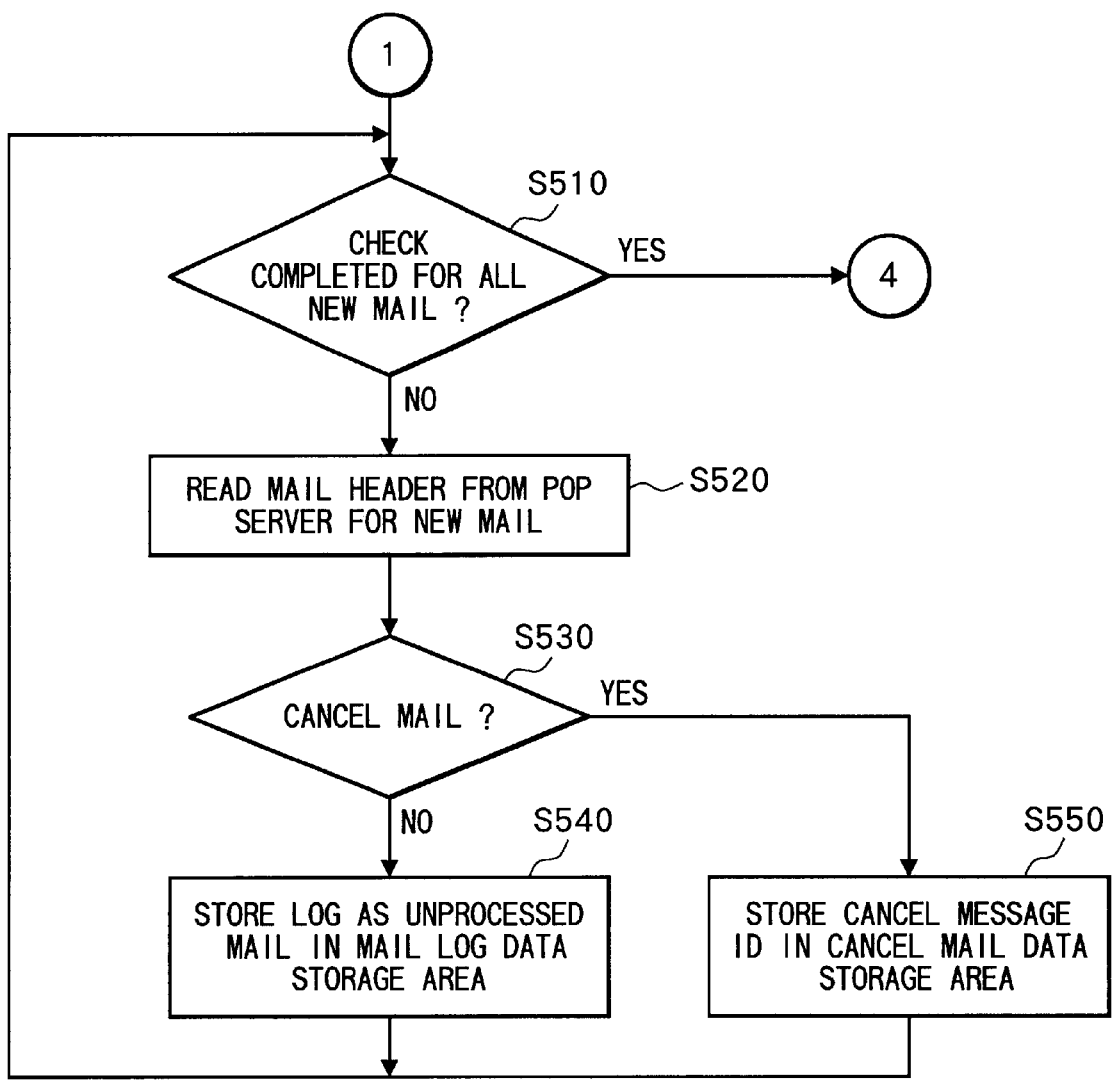
FIG. 10 is a flowchart showing part of the print mail reception utility process executed by the printing system.

On the other hand, when the determination in S320 determines that one or more sets of newly-arrived mail exists in the mail spool 34 of the mail server 26 ("yes" in S320), then the program proceeds to S510 shown in FIG. 10.

The program determines in S510 whether a new mail check process of S520–S550 has been completed for all the newly-arrived sets of mail data (print mail, ordinary mail, and cancel mail).

When the new mail check of S520–S550 has not yet been completed for all the newly-arrived mail ("no" in S510), then in S520, the program requests the POP server 38 to read a mail header of one set of newly-arrived mail (print mail ordinary mail, or cancel mail) from the mail spool 34. Next, the program determines in S530, based on the read out mail header, whether the corresponding mail is cancel mail, which has been sent to the present computer 10 in order to cancel one or more sets of print mail previously sent towards the computer 10.

If the mail header indicates that the corresponding mail is not cancel mail ("no" in S530), mail log of the corresponding mail is recorded in S540 in the mail log data storage area of the RAM 133. Data of this mail log is constructed from data included in the mail header and is designed to indicate that the corresponding mail is unprocessed mail, not yet subjected to mail print processes of S610–S950. As will be described later, a set of mail log data 52*a*, indicative of this newly-recorded mail log, will be newly added to the mail log window 52 in S880 (FIG. 12) if the corresponding mail is targeted for printing, but is not targeted for cancellation.

If the mail header indicates that the corresponding mail is cancel mail ("yes" in S530), on the other hand, one or more cancel message IDs written in the mail header are stored in S550 in the cancel mail data storage area prepared in the RAM 133 of the personal computer 10. The one or more cancel message IDs indicates one or more sets of print mail that have been sent to the computer 10 prior to the subject cancel mail and that should be deleted so as not to be printed out.

Figure 11:
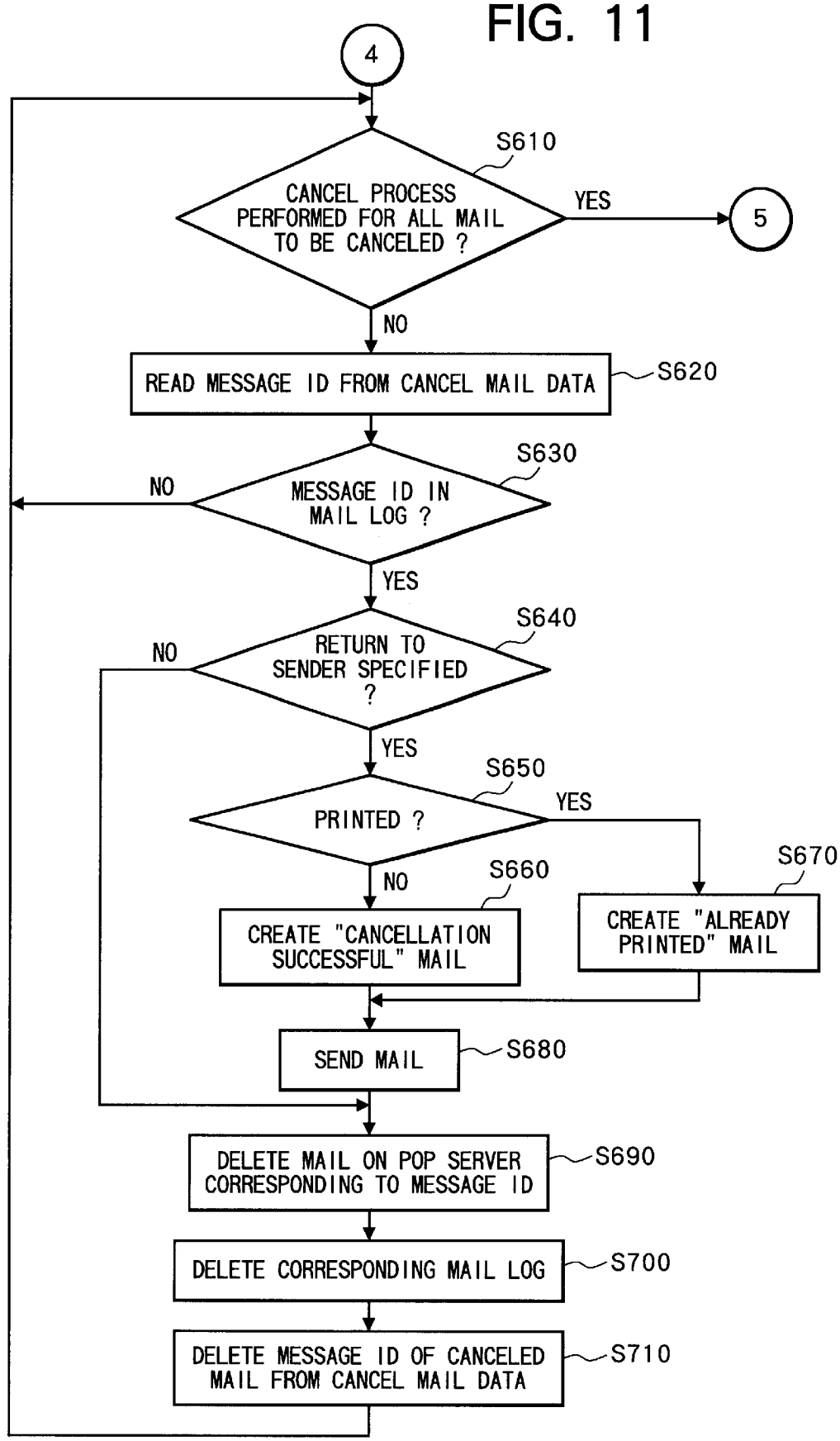
FIG. 11 is a flowchart showing part of the print mail reception utility process executed by the printing system.

When the above-described new mail check processes of S520–S550 have been completed for all the newly-arrived sets of mail data ("yes" in S510), the program proceeds to S610 shown in FIG. 11. The program determines in S610 whether a cancel process of S620–S710 is completed for all the sets of print mail that are indicated by the cancel message IDs newly stored in the cancel mail data storage area in S550.

When this cancel process has not yet been performed for all the cancel message IDs ("no" in S610), then one cancel message ID is read in S620 from the cancel mail data storage area. Next, the program determines in S630 whether print mail, whose message ID corresponds to the cancel message ID, exists in the mail log data storage area. That is, the program determines whether there exists mail log data indicative of an message ID corresponding to the cancel message ID. If no message ID corresponding to the cancel message ID exists ("no" in S630), then the process returns to S610. On the other hand, if mail log data corresponding to the cancel message ID exists in the mail log data storage area ("yes" in S630), then the program determines in S640 whether the mail header of the cancel mail is set with a designation to return a confirmation to a sender. If the cancel mail is not set with the return designation ("no" in S640), then the process jumps to S690.

On the other hand, if the cancel mail is set with the return designation ("yes" in S640), then the program determines in S650 based on the mail log data whether at least a part of print data in print mail indicated by the cancel message ID has already been outputted to be printed. The judgment in S650 becomes affirmative both when the print mail has already been completely printed and when the print mail is presently being printed. The judgment in S650 becomes negative only when any part of the print data has not yet been transferred to any printer, that is, when printing of the print mail has not yet been started. Accordingly, if the mail indicated by the cancel message ID has not yet been started to be printed ("no" in S650), then the program creates in S660 a set of return mail data indicating that cancellation is successful. However, if the print mail indicated by the cancel message ID has already been printed or is in the middle of the printing ("yes" in S650), then the program creates in S670 another set of return mail data indicating that printing has been completed or has been started. This return mail shows that cancellation is failed.

The return mail thus created in S660 or S670 is transmitted back in S680 to the sender of the cancel mail. It is noted that the address of the sender is indicated in the mail header of the cancel mail. By receiving this mail, the sender of the cancel mail can determine whether the cancellation is successfully performed.

The program proceeds to S690 from S680. The program proceeds to S690 also when a negative judgment is achieved in S640. In S690, the personal computer 10 instructs the POP server 38 to delete data of the print mail indicated by the cancel message ID. Upon receiving this instruction, the POP server 38 deletes the corresponding print mail data from the mail spool 34.

Next, in S700, the program deletes, from the mail log data storage area, mail log data including a message ID corresponding to the cancel message ID. Finally, in S710, the program deletes, from the cancel mail data storage area, the cancel message ID indicative of the print mail that has been just canceled in S690.

Then, the program returns to S610. Hence, as long as some cancel mail information (cancel message ID) exists in the cancel mail data storage area ("no" in S610), the processes of S620–S710 are repeatedly executed, thereby canceling from the server 26 all the sets of print mail data indicated by the cancel message IDs included in the newly-received cancel mail and canceling all the corresponding mail log data from the mail log data storage area of the computer 10.

Thus, the computer system 22 at the receiving end deletes data of print mail immediately after receiving cancel mail for requesting cancellation of that print mail. Thus, it is ensured that the print mail be prevented from being printed at the receiving end.

Figure 12:
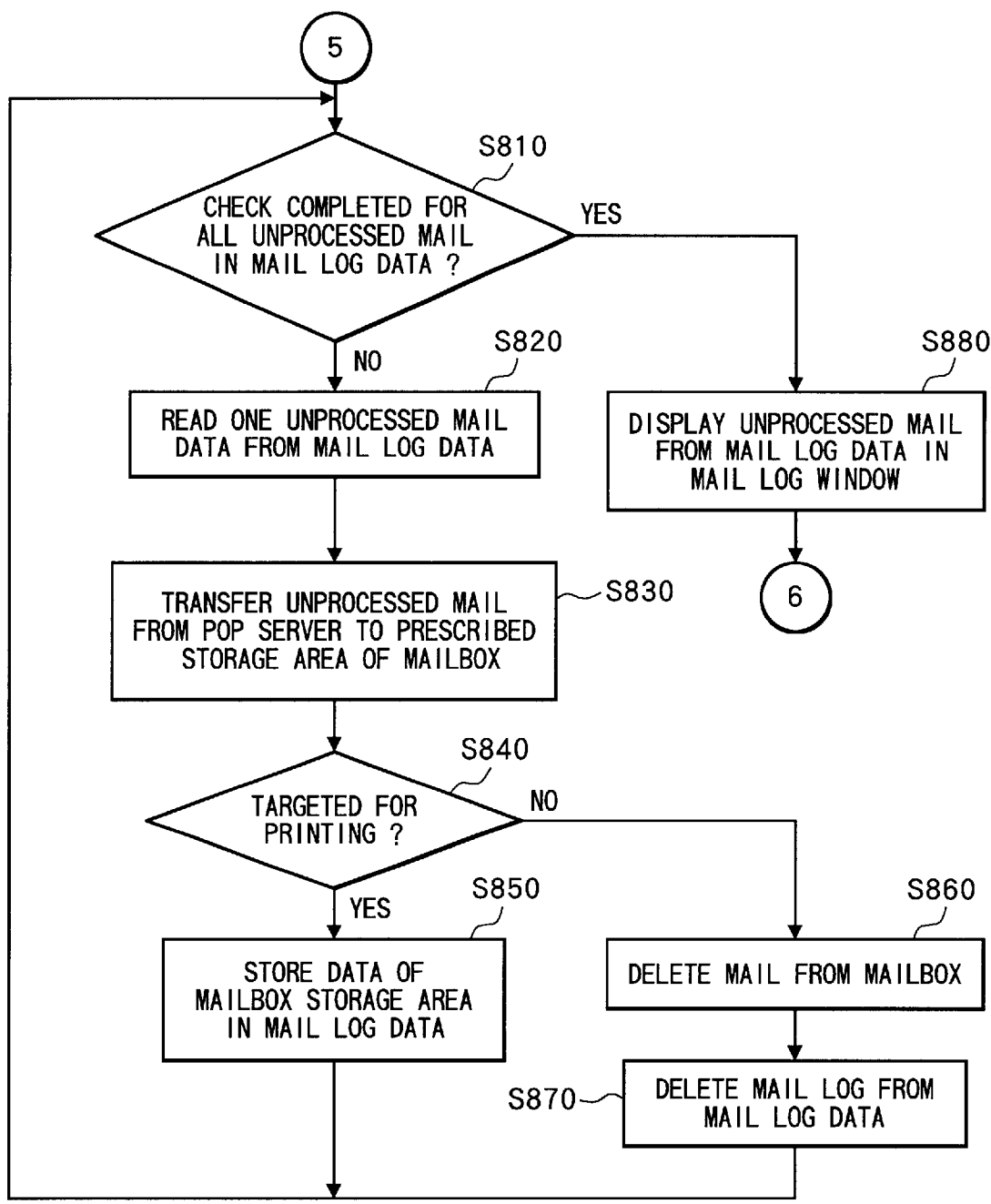
FIG. 12 is a flowchart showing part of the print mail reception utility process executed by the printing system.

When all the sets of print mail data, indicated by the cancel message IDs in all the newly-received cancel mail, and their corresponding log data are canceled, the cancel process of S620–S710 is completed ("yes" in S610), and the program proceeds to S810 shown in FIG. 12.

In S810, the program determines whether print check process of S820–S870 has been completed for all the sets of unprocessed mail data (print mail data and ordinary mail data) whose mail log data is presently stored in the mail log data storage area as indicating that the corresponding mail is unprocessed. If the print check process has not yet been completed for all the unprocessed mail data sets ("no" in S810), then in S820, the program reads, from the mail log data storage area, one set of mail log data (mail header data) indicative of one set of unprocessed and not-yet checked mail data. Then, in S830, the program requests the POP server 38 to transfer one set of mail data, corresponding to the read mail log data, from the mail spool 34. The set of mail data is then stored in a predetermined storage area of the mailbox 40.

In S840, the program determines whether the set of mail data, newly stored in the predetermined storage area of the mailbox 40, should be printed. This judgment is performed based on the setting conditions already set by the user during the process of S380. More specifically, the contents of the corresponding mail header (mail log data) are first examined. Then, the following judgments (1)–(3) are performed based on the contents of the mail header. The first judgment (1) is for judging whether or not the mail is print mail which has been created by and sent from the print mail transmission utility 31a of a remote computer. The second judgment (2) is for judging whether or not the mail has been sent from the user's set specified transmitter. The third judgment (3) is for judging whether or not the mail is on a certain subject also set by the user. The mail is determined as targeted for printing when either one of the three judgments (1)–(3) is made affirmative in view of the setting conditions already set during the setting process of S380. The mail may be determined as targeted for printing when a combination of two or all of the three judgments (1)–(3) is made affirmative.

If it is determined that the mail should be printed ("yes" in S840), then in S850 the program stores, in the mail log data storage area, information on the storage area in which the subject mail data is stored. For example, the program stores, in the mail log data storage area, data indicative of a path to the directory of the hard disk 134 in which the mail data is stored. If it is determined that the mail data should not be printed ("no" in S840), on the other hand, the mail data is deleted in S860 from the mailbox 40. Then, in S870, mail log data for the subject mail is deleted from the mail log data storage area.

Then, the process returns to S810. In this way, the print check processes of S820–S870 are repeated for all the unprocessed mail data sets specified by the mail log data presented in the mail log data storage area. When these print check processes have been completed for all the unprocessed mail data sets ("yes" in S810), the program proceeds to S880. In S880, log of all the unprocessed mail data sets, indicated as unprocessed by mail log data presently stored in the mail log data storage area, is newly added to be displayed on the mail log window 52.

Figure 13:
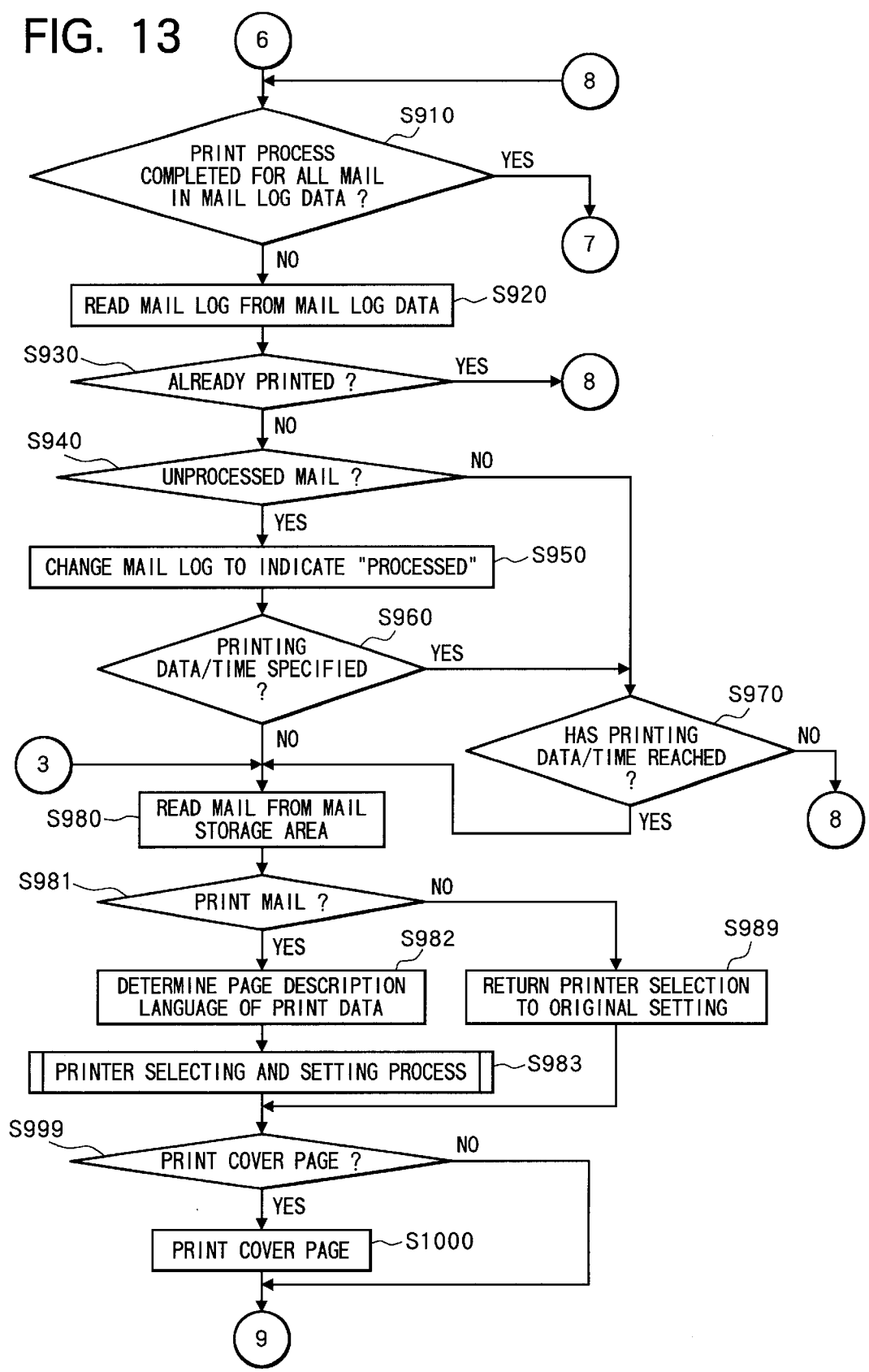
FIG. 13 is a flowchart showing part of the print mail reception utility process executed by the printing system.

Then, the process goes to S910 shown in FIG. 13. In S910, the program determines whether a mail print process of S920–S1170 has been completed for all the mail data sets whose mail log data is presently recorded in the mail log data storage area. In other words, the program determines whether the mail print process of S920–S1170 has been completed for all the mail data sets that are presently registered in the mail log data storage area. When the mail print process has not yet been completed for all the mail data sets registered in the mail log data area ("no" in S910), then one set of mail log data is read from the mail log data storage area in S920. Next, the program determines in S930 whether mail data corresponding to the presently-read mail log data has already been printed. If the mail data has been already printed ("yes" in S930), the process returns to S910.

If the mail data has not yet been printed ("no" in S930), on the other hand, the program determines in S940 whether the mail is unprocessed mail, on which the mail print process of S920–S1170 has not yet been executed. If the mail is unprocessed mail ("yes" in S940), the program proceeds to S950, in which the mail log data for this mail is changed to indicate that the corresponding mail is "processed".

Next, the program determines in S960 whether date and time is designated for printing the subject mail. If the corresponding mail log data (mail header data) includes indication of date and time the mail should be printed ("yes" in S960), then the program determines in S970 whether time has reached the date and time specified in the mail log data. When time has not yet reached the specified date and time ("no" in S970), the process returns to S910.

If the mail log data includes no information on date and time ("no" in S960), the program proceeds to S980. Similarly, when the time has reached the date and time specified by the mail log data ("yes" in S970), the program proceeds to S980. In S980, a set of mail data is read from the mail data storage area in the mailbox 40 at a directory indicated by the mail storage area data included in the mail log data.

Figure 9:
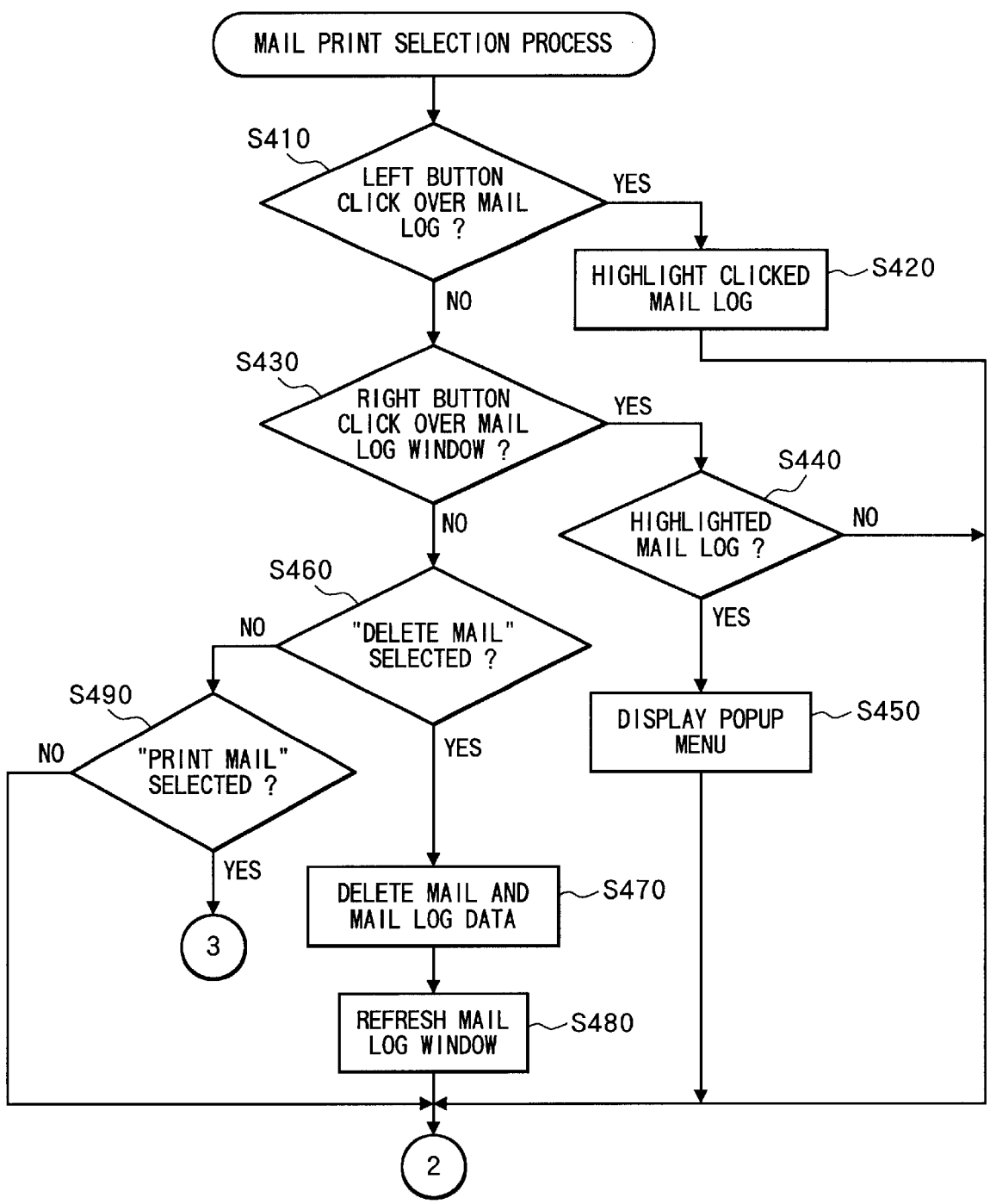
FIG. 9 is a flowchart showing a mail print selection process in the process in FIG. 8.

It is noted that the program directly proceeds to S980 from S490 (FIG. 9) when the user on the computer 10 has selected "Print" in S490 ("Yes" in S490) on the popup menu 52b as shown in FIGS. 9 and 19.

Next, the program determines in S981, based on the contents of the mail log data (mail header), whether the subject mail is print mail, that is, whether the mail has been created by the print mail transmission utility process 31a. This determination is attained through judging whether print information (file attributes) is included in the mail log data (mail header data). If the mail log data includes the print information, the corresponding mail is determined as print mail. If the mail log data does not include print information, on the other hand, the corresponding mail is determined as ordinary mail. If the mail is print mail ("yes" in S981), then in S982 the program inspects the file attributes, included in the mail header, to determine page description language (emulation type) of print data included in the print mail. In the present embodiment, the file attributes include a code indicative of the page description language (emulation type) of the print data. That is, the page description language code indicates PCL, PostScript, GDI, or the like, with which the print data is described or defined. Accordingly, the program easily determines the page description language of the print data based on the page description language code.

Thus, according to the present embodiment, the page description language of the print data is determined in S982 based on the code stored in the mail header. However, the page description language can be determined by checking the print data included in the print mail and determining, from the description itself, what page description language is used.

Next, a printer selecting and setting process of S983 is executed based on the page description language thus determined in S982.

Figure 14:
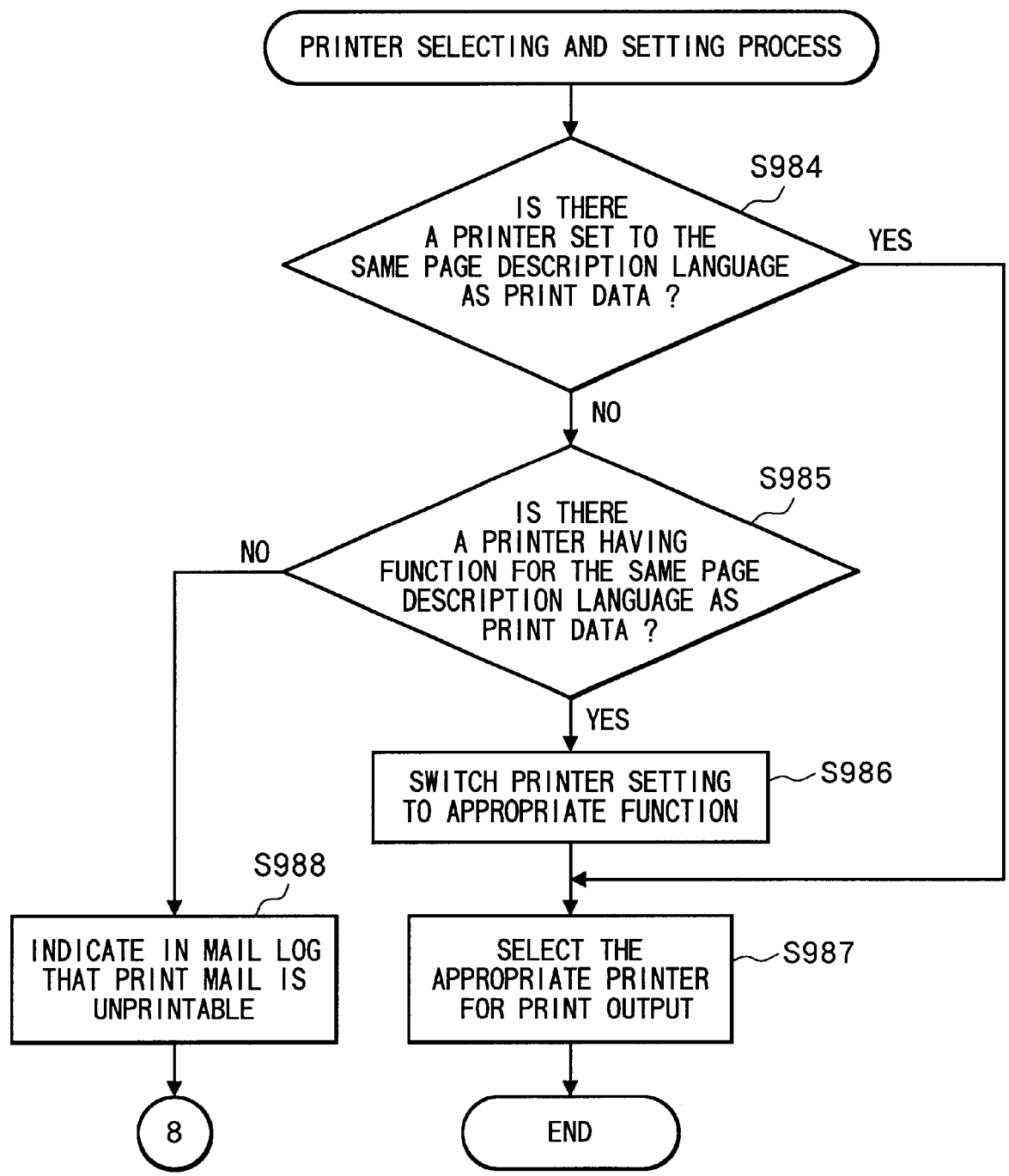
FIG. 14 is a flowchart showing a printer selecting and setting process in the print mail reception utility process.

The printer selecting and setting process of S983 will be described below in more detail with reference to FIG. 14.

First, the program determines in S984 whether at least one of the printers 14, 16, and 18 on the receiving end (computer system 22) is set to the same page description language as determined in S982. This determination is performed based on setting data, of the printers 14, 16, and 18, which has been received via communication from the printers 14, 16, and 18 when the personal computer 10 has been turned ON. Of course, the process of S984 may be designed to access the printers 14, 16, and 18 to receive from the printers 14, 16, and 18 information whether they are set to the same page description language as determined in S982.

It is noted that when the present print mail reception utility process 31b is executed on the computer system 8 side, the process of S984 is executed to judge whether the printer 6 is set to the page description language as determined in S982, because only the printer 6 is provided in the computer system 8 side.

If at least one of the printers provided in the receiving end is set to the same page description language ("yes" in S984), then that printer, set to the same page description language, is set to be used for printing the current print data in S987.

On the other hand, if there exists no printer set to the same page description language ("no" in S984), the program determines in S985 whether at least one of the printers at the receiving end has a function capable of interpreting the page description language of the print data determined in S982 and capable of printing the print data. This determination is performed also based on the setting data of the printers 14, 16, and 18, previously received from the printers 14, 16, and 18 when the personal computer 10 has been turned ON.

If at least one printer has this function to interpret and print the page description language determined in S982 ("yes" in S985), then that printer determined with this function is switched in S986 into the function mode (operation mode) to interpret and print the page description language of the print data. Then, in S987, that printer is set to be used for printing the current print data.

However, if there exists no printer having this function to interpret the page description language as determined in S982 ("no" in S985), then in S988 a message is displayed in the mail log window 52 indicating that the current print mail is unprintable, and the process returns to S910.

On the other hand, if the program determines that the current mail is not print mail but ordinary mail ("no" in S981), then the process of S989 is executed to return the selection setting of the printer to its initial setting.

Then, the program proceeds to S999. In S999, the program determines whether the cover page print setting has been set by the user of the computer 10 (receiving side) during the process of S380 shown in FIG. 8. If the cover page print setting has been set ("yes" in S999), a cover page printing process of S1000 is executed. During this process, when the current mail is print mail, a cover page is printed by the printer selected in S987. If the mail is not print mail but is ordinary mail, on the other hand, a cover page is printed by the initially-set printer which is reset in S989. For example, the print mail is printed by the printer 14 which is selected in S987, while the ordinary mail is printed by the printer 18 when the printer 18 has been initially set to print mail. However, the ordinary mail may be printed by the printer 14 when the printer 14 has been initially set to print mail.

Figure 15:
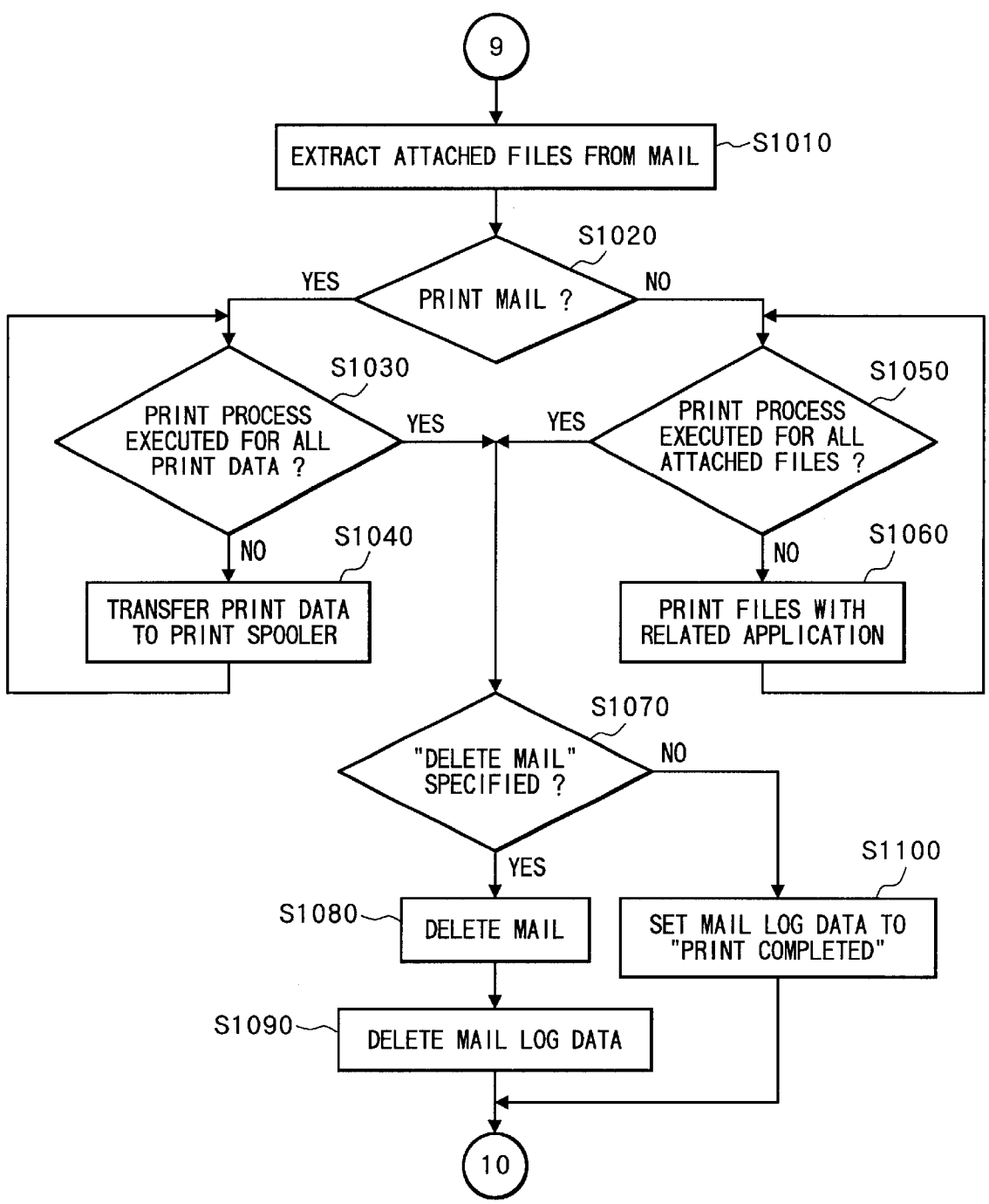
FIG. 15 is a flowchart showing part of the print mail reception utility process executed by the printing system.

When the cover page print process of S1000 is completed, the program proceeds to S1010 shown in FIG. 15. It is noted that if the cover page print setting has not been selected ("no" in S999), the program directly proceeds to S1010. In S1010, all the attached file(s) included in the subject mail is extracted.

Then, in S1020, the program determines, based on the mail header (mail log data) of the subject mail, whether the subject mail is print mail which has been created using the print mail transmission utility process 31a. If the mail is print mail ("yes" in S1020), the program proceeds to S1030, wherein the program determines whether a print process of S1040 has been completed for all the print data included in the file attached to the subject mail. If the print process has not yet been completed for all the print data in the attached file ("no" in S1030), one piece of print data from a plurality of pieces of print data constituting the attached file, is transferred in S1040 to a print spooler. The print spooler is a software program executed on the computer 10 to temporarily store print data in the memory or the hard disk provided to the computer 10 and to transfer the print data to a printer according to the printing state of the printer. For example, when an operating system named "Windows", a product of Microsoft Corporation, is being used as an operating system on the personal computer 10, the print data is transferred to a print spooler named "Windows print spooler", also a product of Microsoft Corporation. During this process, the operating system executes a process to control the printer 14, selected in S987, via the LAN 20 to print the print mail. The print process of S1040 is executed repeatedly as long as print data not yet printed exists remaining ("no" in S1030).

On the other hand, if the mail subject to printing is not print mail but ordinary mail ("no" in S1020), the program proceeds to S1050. In S1050, the program determines whether another print process of S1060 has been executed for contents or data included in all the files attached to the subject mail. When the print process of S1060 has not yet been executed for the contents in all the attached files ("no" in S1050), then the print process of S1060 is performed. That is, an application program, corresponding to the file format of each attached file, is selected. For example, an application program, corresponding to the extension of the attached file's file name, is selected. The selected application program is started to execute on the computer 10. The application program is then instructed to perform a print process to print the contents in the corresponding attached file. For example, the application program controls the printer 18 to print the contents of the attached files. It is noted that the application program selects a printer appropriate to print the corresponding file. Accordingly, the process of S989 is not necessarily performed. During the printing process of S1060, a message included in the ordinary mail is also printed together with the attached files.

Figure 8:
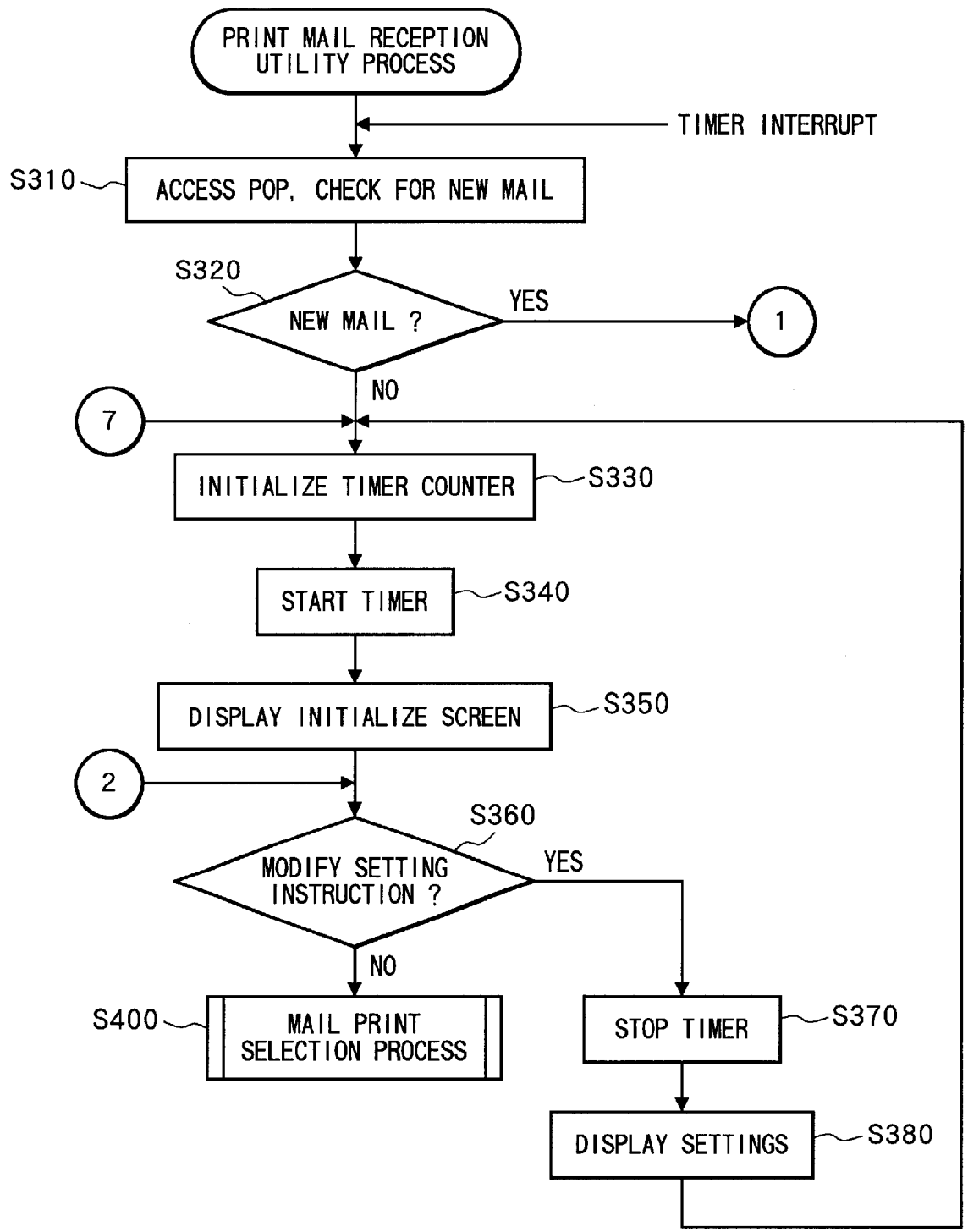
FIG. 8 is a flowchart showing part of a print mail reception utility process executed by the printing system.

When the print process has been completed for all the attached file(s) ("yes" in S1030 or "yes" in S1050), the program determines in S1070 whether the setting conditions, set by the user of the computer 10 during the process of S380 in FIG. 8, include an instruction setting to delete each mail after the mail is processed to be printed. If the setting conditions include the setting to delete the processed mail ("yes" in S1070), then the program deletes in S1080, from the mailbox 40, the mail data that has been just printed in S1040 or S1060. Then, the program further deletes in S1090, from the mail log data storage area, the corresponding mail log data. If the setting conditions include no settings to delete processed mail data ("no" in S1070), then the mail log data of the corresponding mail data is merely converted in S1100 to indicate "print completed".

Figure 16:
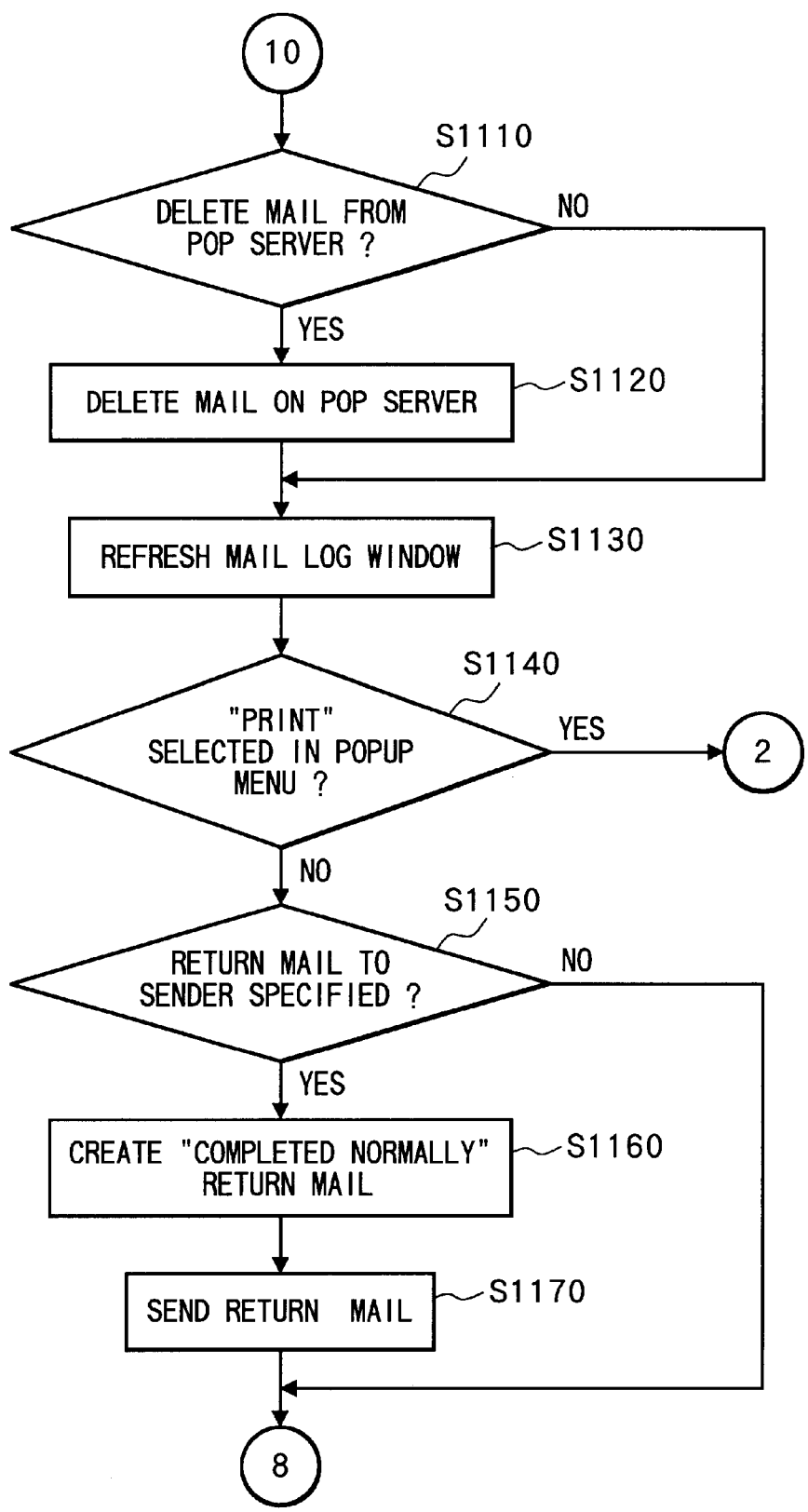
FIG. 16 is a flowchart showing part of the print mail reception utility process executed by the printing system.

After the process S1090 or S1100 is performed, the program proceeds to shown in FIG. 16. The program determines in S1110 whether the setting conditions, set by the user during the process of S380 in FIG. 8, include an instruction to instruct the POP server 38 to delete print-completed mail from the mail spool 34. If the setting conditions include the instruction setting to delete the print-completed mail from the mail spool 34 ("yes" in S1110), then in S1120 the program instructs the POP server 38 to delete the mail data, which has just been printed in S1040 or S1060, from the mail spool 34. Then, the program proceeds to S1130.

If the setting conditions include no instruction to delete print-completed mail from the mail spool 34 ("no" in S1110), the program directly proceeds to S1130. In S1130, display of the mail log window 52 is renewed to reflect the change in the mail log data performed in S1090 or S1130, Next, the program determines in S1140 whether the print process from S980–S1130 has been started because the user has selected "Print" on the popup menu 52b of FIG. 19 in S490. If the print process from S980≧S1130 has been started in response to the user's selection of "Print" on the pop menu 52b ("yes" in S1140), then the process returns to S360 in FIG. 8. On the other hand, if the print process has not been started in response to the user's selection of "Print" on the pop menu 52b ("no" in S1140), the program determines in S1150 whether the mail header of the mail, which has been just printed, includes an instruction setting to send a return mail to a sender that has sent the corresponding mail. If the mail header includes the instruction setting to send a return mail to a sender ("yes" in S1150), then the program creates in S1160 a set of return mail data indicating that the printing process has been performed properly, and sends in S1170 the return mail to the sender of the printed mail. Then, the program returns to S910 shown in FIG. 13.

On the other hand, if the mail header includes no instruction setting to send a return mail to sender ("no" in S1150), the process directly returns also to S910. In S910, the program again determines whether any mail is registered remaining unprocessed in the mail log data storage area.

If some mail is registered remaining unprocessed in the mail log data storage area ("no" in S910), then the print processes of S920–S1170 are executed again for the unprocessed mail.

If the print processes of S920–S1170 have been completed for all the sets of mail data registered in the mail log data storage area ("yes" in S910), then the process returns to S330 shown in FIG. 8.

It is noted that in the above-described embodiment, the print mail reception utility 31b is designed to consider that the cancel operation has failed not only when the print mail has been printed completely but also when printing of the print mail has been started but has not yet been completed, that is, when the print mail is being printed by the print spooler. That is, when receiving the cancel mail in the middle of the printing of the corresponding print mail, the print spooler will continue printing the print mail to complete the printing. The print mail reception utility 31b sends, in S670 and S680, return mail indicating that the print mail targeted for cancellation has been printed.

However, the print mail reception utility 31b may be modified to stop printing the print mail even when the cancel mail is received in the middle of the printing operation. That is, when the print mail has already been transferred to the print spooler ("Yes" in S650), the program issues a print stop command to the print spooler so as to control the print spooler to stop printing the print mail. Thus, printing can be stopped even after the print data has been partially printed. In this case, in S670, the reply mail is preferably designed to indicate that a part of the mail has been printed.

Figure 20:
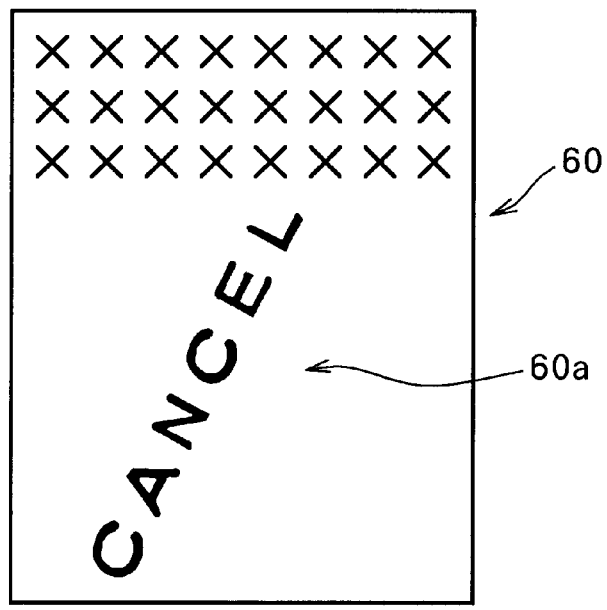
FIG. 20(a) illustrates one example of a last page obtained when printing is canceled in the middle of the printing.
FIG. 20(b) illustrates another example of a last page obtained when printing is canceled in the middle of the printing.
Figure 20:
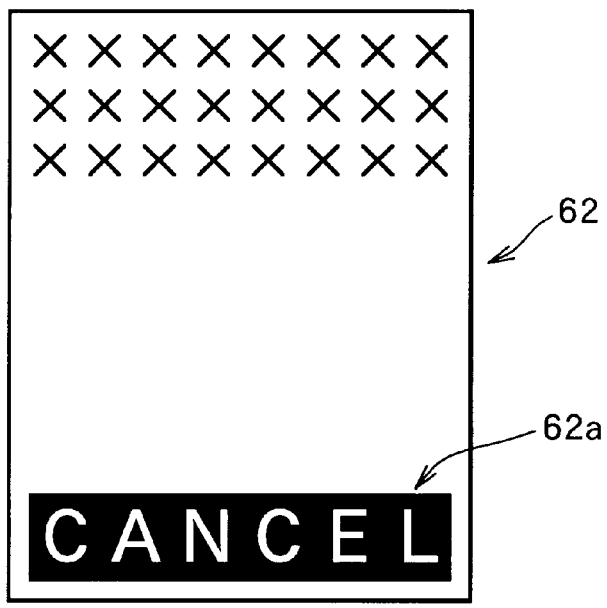

With this method, however, printing is stopped in the middle of the printing operation. Accordingly, the user on the receiving end may be confused as to why the printing is stopped in the middle of the printing. In view of this, when the printing operation is stopped in the middle of the printing, it is desirable to print a special message 60a as shown in FIG. 20(a) on a page 60 that is being printed last. For example, the special message 60a, such as "Cancel," is printed with using a different character size and a different color from the rest of the printed document. Another special message 62a may be printed on the last page 62 as shown in FIG. 20(b).

As described above, in the present embodiment, when a request to execute a print process is issued by an application program running on the computer system 8, the user first selects in S130 during the printer driver process whether to print print data by the computer system 8 itself or to have the print data printed on the remote computer system 22 which is connected to the computer system 8 via the communication line.

If the user selects printing the print data on the computer system 8 in S130, then the print data is printed by the printer 6 provided to the computer system 8. Thus, the user at the transmitting side can obtain printed matter of the print data.

If the user selects printing the print data on the computer system 22 in S130, on the other hand, then the processes of S150–S170 and S210–S280 are executed to create print mail through adding, to the print data, mail header data including print information such as the printing conditions, at which the print data should be printed, and then to transmit the print mail via the communication line addressed to the personal computer 10. Similarly to ordinary mail, the print mail can be exchanged between a plurality of senders and receivers, rather than just one-to-one transmissions. The print mail can be exchanged using a packet communication system. Accordingly, the costs required to use the communication line becomes inexpensive.

The judging process of S1020 detects whether or not the received mail is print mail. In other words, the judging process of S1020 detects whether or not print information is included in the mail header of the received mail. When the received mail is print mail whose header includes the print information ("Yes" in S1020), the printing process of S1040 is performed on the selected printer 14, 16, or 18 to print the print data included in the print mail according to the print information included in the mail header. Hence, the print data can be printed on the receiving end (computer system 22) in the form set on the transmitting end (computer system 8). The transmitting user's desired printed matter can therefore be easily supplied from the computer system 8 to the remote computer system 22.

The computer system 22 at the receiving end is configured to perform, at the specified regular interval, the processes of S510, S520, and S540 to check for the existence of mail that has newly arrived as addressed to the computer system 22 via the communication line. The newly-arrived mail is then processed in the processes of S1020, S1040, and the like. As a result, the mail can be quickly obtained for printing on the computer system 22.

In the above-described embodiment, the user on the transmitting end, who wishes to revise or delete a print mail mistakenly sent to a remote user, can transmit a cancel mail to the destination address of the same remote user to have the specified print mail deleted on the remote user's computer system in S690, thereby preventing the print mail from being printed on the remote user's end. Also, the user on the transmitting end can know whether the printing has been prevented based on mail returned from the remote user in S660–S680 and can take appropriate measures when the mail cancellation has not been successful.

It is noted that the computer system 8 at the transmitting end is provided not only with the printer driver 30 for performing the processes including the processes of S130–S170 and the print mail transmission utility 31a for performing the processes S210–S280 but also with the print mail reception utility 31b for performing the processes including the processes of S1020 and S1040. Accordingly, the computer system 8 can perform not only the above-described transmission of print mail but also reception of print mail.

Similarly, the computer system 22 at the receiving end is provided not only with the print mail reception utility 31b for achieving processes including the processes of S1020 and S1040 but also with the printer driver 30 for achieving the processes including the processes of S130–S170 and the print mail transmission utility 31a for achieving the processes of S210–S280. Accordingly, the computer system 22 can perform not only the above-described reception of print mail but also transmission of print mail. Hence, transmission of print mail and reception-and-printing of the print mail can be performed bi-directionally between the two computer systems 8 and 22.

At the transmitting end, data indicative of date and time, at which print mail is desired to be printed, can be included in the mail header through the processes of S230–S250. The mail header is added to the print data (mail body) in S260, and is transmitted to the receiving end. At the receiving end, the print mail reception utility 31b detects in S960 whether the print date and time data is included in the header. When the print date and time data is included in the header, the print data included with the mail can be outputted by the printer at the indicated date and time through the process of S970.

In the above description, the cancel mail selection process of S112 serves to specify print mail that has been transmitted already to a receiving end and that the user wishes to prevent the receiving end from printing. The processes of S115 and S116 serve to create cancel mail for requesting the receiving end not to print the print mail. The process of S117 serves to transmit cancel mail to the address of the receiving end, to which the print mail has already been transmitted. The process of S280 serves to accumulate transmission log data. The process of S530 serves to determine whether received mail is cancel mail. The process of S690 serves to prevent printing of the print mail designated by the cancel mail. The processes of S660 and S680 serve to transmit a return mail to inform the transmitting end of success in cancellation. The processes of S670 and S680 serve to transmit another return mail to inform the transmitting end of failure in cancellation.

As described above, according to the present embodiment, the mail header of the print mail includes, as print information, data indicative of status of the print data, i.e., the page description language of the print data and the number of pages of the print data. Accordingly, the receiving end can automatically select a printer appropriate to print the print data in the print mail or can automatically adjust the printing condition of a printer as appropriate to print the print data in the print mail.

The mail header further includes, as print information, data of the number of copies, into which the print mail should be copied. In the receiving end, therefore, print data in the print mail can be automatically copied as instructed by the mail header.

In the above-described embodiment, the printer appropriate to print the print data in print mail is set in the process of S983. If two or more printers are determined as appropriate to print the print data in S984 or S985, one appropriate printer, that is not presently being driven, is preferably selected for printing the print data.

In the above-described embodiment, the printer driver process of FIG. 4 creates print data in the same format as required to print on the transmitter's side. The print data is then included in print mail as an attached file and then is transmitted to the remote user in the process of the print mail transmission utility 31a shown in FIG. 7.

However, the print data, to be transmitted to the remote user, may be prepared to conform to the functions of the remote user's printer. For example, the print data may be created in correspondence with a type of page description language (emulation) interpretable by the remote user's printer. The print data may be created into full color data when the remote user's printer is of a full color printer. The print data may be created into monochromatic data when the remote user's printer is of a monochrome printer. The print data may be created into data suitable for an ink-jet printer when the remote user's printer is an ink-jet printer. The print data may be created into data suitable for a dot impact type printer when the remote user's printer is a dot impact type printer. The print data may be created into data suitable for a thermal transfer type printer when the remote user's printer is of a thermal transfer type. The print data may be created as suitable for the size of papers employed in the remote user's printer.

The type and/or function of the remote user's printer may be registered in the transmitter's computer in advance. For example, before creating print data, confirmation mail may be transmitted to the remote user in order to confirm the type and function of the remote user's printer. When information on the type and function of the remote user's printer is returned via return mail, data for the type and function is recorded. Or, the user may manually enter, into the computer, data of the type and function of the remote user's printer.

When desiring to transmit print mail to that remote user, when the user designates the address of the remote user, print data is automatically created in a format conforming to the type and function of the remote user's printer, and the print mail is transmitted to the remote user.

When desiring to transmit print mail to a certain remote user, if no type or function data is registered for that remote user, print data may be created using a predetermined standard default format. For example, the print data may be created through converting originally-edited data to PCL. Only character data within the originally-edited data may be converted into print data.

In the above-described embodiment, the process of the print mail transmission utility 31a is actuated by the printer driver 30 when the user selects transmitting print mail. However, the processes of the print mail transmission utility 31a may be included in the printer driver 30 in its internal process.

Functions for achieving the various processes of the printer driver 30, the print mail transmission utility 31a, and the print mail reception utility 31b may be stored as computer programs that are executed on each of the personal computers 4, 10, and 12. These programs are stored on a data storage medium capable of being read by the corresponding computer.

In the above-described embodiment, the programs are stored in a ROM capable of being read by the corresponding computer. The ROM is installed in each computer 4, 10, or 12. However, the programs may be stored in a backup RAM capable of being read by the corresponding computer. The backup RAM is installed in each computer 4, 10, or 12. Or, these programs may be stored in a floppy disk, a magneto-optic disk, a CD-ROM, a hard disk, or the like. The programs are loaded into each personal computer 4, 10, or 12 and are executed as needed.

In the above-described embodiment, the Internet 28 is used as the communication line for transmitting the print mail between the computer systems 8 and 22. However, any other network systems capable of transferring electronic mail therethrough can be used for transmitting print mail between the computer systems 8 and 22.

While the invention has been described in detail with reference to the specific embodiment thereof, it would be apparent to those skilled in the art that various changes and modifications may be made therein without departing from the spirit of the invention.

What is claimed is:

1. A mail reception device capable of receiving mail from a mail transmission device via a communication line, the mail reception device comprising:

a printer capable of printing mail:

mail receiving means capable of receiving mail via a communication line;

print mail determining means for determining whether mail, received via the communication line, is print mail that includes print data and header data, the header data including print information indicative of a printing condition, at which the print data is desired to be printed;

printing process means for, when the print mail determining means determines that the received mail is print mail, controlling the printer to print the print data, included in the received print mail, in accordance with the print information;

cancel mail determining means for determining whether mail, received via the communication line, is cancel mail containing an instruction to cancel printing of at least one set of previously-received print mail and information designating the at least one set of print mail desired not to be printed;

mail printing preventing means for, when the cancel mail determining means determines that the received mail is cancel mail, preventing the printer from printing the at least one set of print mail designated by the cancel mail; and reply mail transmitting means for transmitting, to the source of the cancel mail, reply mail indicating that cancel has failed when the cancel mail is received after the printer has started printing at least a part of the designated print mail.

2. A mail reception device as claimed in claim 1, wherein the reply mail transmitting means transmits reply mail indicating that at least a part of the designated print mail has been printed.

3. A mail reception device as claimed in claim 1, wherein the mail printing preventing means prevents the printer from printing the designated print mail when the cancel mail is received after the printing has been partially performed, the reply mail transmitting means transmitting, to the source of the cancel mail, reply mail indicating that printing has been partially performed.

4. A mail reception device as claimed in claim 3, wherein the mail printing preventing means prevents the printer from printing the designated print mail when receiving the cancel mail after the printer starts printing the designated print mail, the mail printing preventing means controlling the printer to print a symbol, indicating that the printing is stopped in the middle of the printing, after stopping printing of the print mail.

5. A mail reception device as claimed in claim 1, wherein the reply mail transmitting means transmits, to the source of the cancel mail, reply mail indicating that cancel has failed when the cancel mail is received after the printer has completed printing the designated print mail.

6. A mail reception system, provided in a computer system capable of receiving mail from another computer system via a communication line, the mail reception system comprising:

print mail determining means for determining whether mail, received via a communication line, is print mail that includes print data and header data, the header data including print information indicative of a printing condition, at which the print data is desired to be printed;

printing process means for, when the print mail determining means determines that the received mail is print mail, controlling a printer, connected to the computer system, to print the print data, included in the received print mail, in accordance with the print information;

cancel mail determining means for determining whether mail, received via the communication line, is cancel mail containing an instruction to cancel printing of at least one set of previously-received print mail and information designating the at least one set of print mail desired not to be printed;

mail printing preventing means for, when the cancel mail determining means determines that the received mail is cancel mail, preventing the printer from printing the at least one set of print mail designated by the cancel mail; and reply mail transmitting means for transmitting, to the source of the cancel mail, reply mail indicating that cancel has failed when the cancel mail is received after the printer has started printing at least a part of the designated print mail.

7. A mail reception system as claimed in claim 6, wherein the reply mail transmitting means transmits reply mail indicating that at least a part of the designated print mail has been printed.

8. A mail reception system as claimed in claim 6, wherein the reply mail transmitting means transmits, to the source of the cancel mail, reply mail indicating that printing has been partially performed when the mail printing preventing means prevents the printer from printing the designated print mail in response to cancel mail that is received after the printing has been partially performed.

9. A mail reception system as claimed in claim 8, wherein the mail printing preventing means prevents the printer from printing the designated print mail when receiving the cancel mail after the printer starts printing the designated print mail, the mail printing preventing means controlling the printer to print a symbol, indicating that the printing is stopped in the middle of the printing, after stopping printing of the print mail.

10. A mail reception system as claimed in claim 6, wherein the reply mail transmitting means transmits, to the source of the cancel mail, reply mail indicating that cancel has failed when the cancel mail is received after the printer has completed printing the designated print mail.

* * * * *